United States Patent [19]

Fergason

[11] Patent Number: 5,319,481
[45] Date of Patent: Jun. 7, 1994

[54] ENCAPSULATED LIQUID CRYSTAL OPTICAL READ/WRITE STORAGE MEDIUM AND SYSTEM

[75] Inventor: James L. Fergason, Atherton, Calif.

[73] Assignee: Raychem Corporation, Menlo Park, Calif.

[21] Appl. No.: 844,957

[22] Filed: Feb. 28, 1992

Related U.S. Application Data

[63] Continuation of Ser. No. 725,906, Jul. 3, 1991, which is a continuation of Ser. No. 610,446, Nov. 8, 1990, abandoned, which is a continuation of Ser. No. 135,018, Dec. 18, 1987, which is a continuation-in-part of Ser. No. 113,505, Oct. 28, 1987, abandoned, which is a continuation of Ser. No. 945,835, Dec. 23, 1986, abandoned.

[51] Int. Cl.⁵ ............................................ G02F 1/133
[52] U.S. Cl. .................................. 359/87; 359/51; 359/84; 369/100
[58] Field of Search ............... 350/334, 331 R, 347 V, 350/336, 338, 339 R, 347 R, 349, 350 S, 351; 250/326; 361/230; 359/43, 44, 45, 51, 52, 87, 98, 92, 106, 824, 84; 365/108; 369/100, 126

[56] References Cited

U.S. PATENT DOCUMENTS

3,241,466  3/1966  Clark ................................. 355/227

(List continued on next page.)

FOREIGN PATENT DOCUMENTS

| 0118989 | 9/1984 | European Pat. Off. |
|---|---|---|
| 0141512 | 5/1985 | European Pat. Off. |
| 3522849 | of 1986 | Fed. Rep. of Germany |
| 58-100247 | 6/1983 | Japan |
| 60-117429 | 6/1985 | Japan |
| 60-247841 | 12/1985 | Japan |
| 61-68733 | 4/1986 | Japan |
| 0118725 | 6/1986 | Japan ................... 359/45 |
| 0166520 | 7/1986 | Japan ................... 359/45 |
| 0252529 | 11/1986 | Japan |
| 0252530 | 11/1986 | Japan |

| WO85/05467 | 12/1985 | PCT Int'l Appl. |
|---|---|---|
| 8500953 | 12/1985 | PCT Int'l Appl. |
| 8505467 | 12/1985 | PCT Int'l Appl. |

OTHER PUBLICATIONS

Delphax Manual, (Draft), Oct. 10, 1984, Gretchev, pp. ii–v & 1–22, "Theory of Operations".
Proc. of SPIE, vol. 420, pp. 194–199, Jun. 6, 1983, Birecki et al., "Erasable Optical Liquid Crystal Disc Memory", (attached).

*Primary Examiner*—William L. Sikes
*Assistant Examiner*—Kenneth Parker
*Attorney, Agent, or Firm*—Renner, Otto, Boisselle & Sklar

[57] ABSTRACT

An optical read/write information storage system (2), includes a liquid crystal information storage medium (1) for storing information written thereto and being capable of being read, including plural volumes (21) of liquid crystal material (23) in a containment medium (24), the volumes of liquid crystal material being operative to modulate or not to modulate light, e.g. by transmitting or scattering light as a representation of logic 1 and logic 0 information, the storage medium being responsive to a first energy input to assume and to store one detectable output condition and to a second energy input to assume and to store a second detectable output condition, input energy systems for writing and erasing information, and an optical reading device for detecting such output conditions of the storage means as a representation of information stored therein. Pleochroic dye (250) may be used to enhance thermal effects. Pointed electrode (101), controlled wire electrode (141) and electron "spraying" techniques apply charge to affect optical characteristics, e.g., writing and/or erasing, of the storage medium, and an optical writing technique (200) uses a large aperture number lens to focus thermal energy in a liquid crystal volume while minimizing affect on other volumes.

7 Claims, 6 Drawing Sheets

U.S. PATENT DOCUMENTS

| | | | |
|---|---|---|---|
| 3,370,212 | 2/1968 | Frank | 250/326 |
| 3,390,266 | 6/1968 | Epping | 250/326 |
| 3,627,408 | 12/1971 | Fergason . | |
| 3,637,291 | 1/1972 | Kessbs et al. | 359/51 |
| 3,663,086 | 5/1972 | Assouline et al. | 365/108 X |
| 3,734,597 | 5/1973 | Churchill et al. | 359/43 |
| 3,781,085 | 12/1973 | Leibowitz et al. | 359/87 |
| 3,796,999 | 3/1974 | Kahn | 350/350 S |
| 3,851,318 | 11/1974 | Taylor et al. . | |
| 3,947,375 | 3/1976 | Gray et al. | 350/336 |
| 3,951,520 | 4/1976 | Waring, Jr. | 350/353 |
| 4,004,172 | 1/1977 | Schoenmakers . | |
| 4,019,077 | 4/1977 | Sakitani | 313/441 |
| 4,040,047 | 8/1977 | Hareng et al. | 365/108 |
| 4,086,650 | 4/1978 | Davis et al. | 361/230 |
| 4,101,207 | 7/1978 | Taylor | 350/344 |
| 4,140,016 | 2/1979 | Fergason | 350/350 R |
| 4,279,152 | 7/1981 | Crossland | 350/331 T |
| 4,288,822 | 9/1981 | Hareng et al. | 350/350 S |
| 4,396,997 | 8/1983 | Kahn et al. | 365/108 |
| 4,405,993 | 9/1983 | Kahn et al. | 365/108 |
| 4,409,604 | 10/1983 | Fotland | 250/326 |
| 4,435,047 | 3/1984 | Fergason | 350/347 V |
| 4,446,371 | 5/1984 | Cobb | 250/324 |
| 4,448,492 | 5/1984 | Huffman | 359/43 |
| 4,448,872 | 5/1984 | Vandervalk | 355/24 |
| 4,452,511 | 6/1984 | Huffman | 359/43 |
| 4,456,336 | 6/1984 | Chung et al. | 350/338 |
| 4,461,715 | 8/1984 | Lu et al. | 359/90 X |
| 4,476,387 | 10/1984 | Cobb et al. | 250/324 |
| 4,551,819 | 11/1985 | Michl et al. . | |
| 4,602,850 | 7/1986 | Debenedetti | 359/57 |
| 4,603,945 | 8/1986 | Fergason | 350/331 R |
| 4,606,611 | 8/1986 | Fergason | 350/331 R |
| 4,613,207 | 9/1986 | Fergason | 350/334 |
| 4,616,903 | 10/1986 | Fergason | 350/347 V |
| 4,685,771 | 8/1987 | West et al. | 359/51 X |
| 4,693,557 | 9/1987 | Fergason | 350/331 R |
| 4,701,029 | 10/1987 | Crossland et al. | 359/45 |
| 4,702,945 | 10/1987 | Etzbach et al. | 359/98 X |
| 4,707,080 | 11/1987 | Fergason | 350/334 |
| 4,712,878 | 12/1987 | Taniguchi | 359/47 |
| 4,723,836 | 2/1988 | Kono et al. | 350/338 |
| 4,728,174 | 3/1988 | Grinberg et al. | 359/47 |
| 4,732,456 | 3/1988 | Fergason et al. | 350/334 |
| 4,775,226 | 10/1988 | Montgomery, Jr. et al. | 359/52 X |
| 4,853,911 | 8/1989 | Yamazaki | 365/108 X |
| 4,855,976 | 8/1989 | Yamazaki | 365/108 X |

ENCAPSULATED LIQUID CRYSTAL OPTICAL READ/WRITE STORAGE MEDIUM AND SYSTEM

This is a continuation of copending application Ser. No. 07/725,906, filed on Jul. 3, 1991, which is a continuation of copending application Ser. No. 07/610,446, filed on Nov. 8, 1990, now abandoned, which is a continuation of U.S. patent application Ser. No. 07/135,018, filed on Dec. 18, 1987, which is a continuation-in-part of applicant's copending U.S. patent application Ser. No. 113,505, filed Oct. 28, 1987, now abandoned which is a continuation of applicant's U.S. patent application Ser. No. 945,835, filed Dec. 23, 1986, now abandoned.

TECHNICAL FIELD

The invention relates generally, to optical read/write storage media and systems, and, more particularly, to liquid crystal read/write storage media and systems in and by which information can be written, stored, erased, and written again.

CROSS REFERENCE TO RELATED PATENTS AND PATENT APPLICATION

Reference is made to the above-identified U.S. patent applications and the following U.S. patents and U.S. patent applications, the entire disclosures of which hereby are incorporated by reference: U.S. Pat. Nos. 4,435,047, 4,616,903, 4,606,611, 4,613,207, 4,603,945 and 4,707,080 and U.S. patent application Ser. No. 740,218, filed Jun. 3, 1985.

BACKGROUND

The advantages of magnetic media for storing information are well known. These advantages include the ability to write data or information to the magnetic storage medium, to read the data, to erase the data, and to write either the same or different data for storage. Rotating floppy discs exemplify one form of magnetic storage medium; such a disc may be rotated past the read/write head of a disc drive which writes or reads information on the disc. Fixed disc or hard disc magnetic storage media also are known; due to the greater precision and controls thereof and to other factors the fixed or hard disc systems usually are capable of storing more data than can be stored on a single or a small number of floppy discs.

As used herein the terms data and information may be interchanged as synonyms. Ordinarily, though, information may represent or may be represented by a logic one or a logic zero signal or condition, e.g. the on or off condition of a switch; and data is the assemblage of information. These rules and definitions, though, may not be strictly adhered to herein.

Various optical systems for storing data and permitting reading out of the data, e.g. using a laser and photodetector optics, also are known. One example is the laser disc system used for video signal storage and another is the so-called compact disc typically used for music. One drawback to such optical systems has been the inability to erase information stored in the optical storage medium and especially to erase and then again to write information to the storage medium for subsequent storage.

BRIEF SUMMARY OF THE INVENTION

According to the present invention, there is provided an optical read/write storage system including a storage medium which can be written to, can store data, can be read out, can be erased, and can be written again.

According to one aspect of the invention, a liquid crystal information storage medium includes plural volumes of liquid crystal material in a containment medium, the liquid crystal material being birefringent and the containment medium having an index of refraction, the liquid crystal material having a memory characteristic for maintaining structural alignment condition and a corresponding index of refraction condition as a representation of information stored in the storage medium, and wherein the index of refraction condition of the liquid crystal material is detectable to permit reading information stored in the storage medium.

According to another aspect, a liquid crystal optical read/write information storage medium includes plural volumes of liquid crystal material in a containment medium, the liquid crystal material having plural apparent index of refraction characteristics that can be altered and stored, the containment medium having an index of refraction, the index of refraction characteristics of the liquid crystal material and the index of refraction of the containment medium being cooperative selectively to scatter incident light or to transmit incident light, wherein the scattering or transmitting of incident light is detectable as a representation of information stored in the storage medium.

According to a further aspect, an optical read/write information storage system includes a liquid crystal information storage device for storing information written thereto and being capable of being read, including plural volumes of liquid crystal material in a containment medium, the storage device being capable of receiving a first energy input to assume and to store one detectable output condition and being capable of receiving a second energy input to assume and to store a second detectable output condition, a write device for furnishing such energy inputs to the storage means, and a read device means for detecting such output conditions of the storage device.

According to still additional aspects, the invention relates to methods for information storage, retrieval and altering with respect to an optical medium. Information may be stored as a function of alignment characteristics of liquid crystal material in volumes formed in a containment medium. Such alignment characteristics may include at least two distinct conditions that can be selectively altered once or a plurality of times, as may be desired. Moreover, such alignment characteristics relate to index of refraction characteristics that are optically readable.

According to the invention the liquid crystal material in the containment medium is used to store information. In an exemplary case such information may be a logic 1 or a logic 0, which may be represented by respective alignment conditions of liquid crystal structure in volumes thereof formed in a containment medium. The liquid crystal material alone or in interactive combination with the containment medium has a memory characteristic so that after the liquid crystal structure is caused to be in one structural alignment condition or mode, one of such logic levels or logic signals is represented; and the other structural alignment condition or mode represents the other logic level or logic signal. An energy input is required to switch the liquid crystal material from one alignment mode to the other. Such energy input may be, for example, electrical, magnetic, thermal, optical, or other forms of energy.

Electrical and optical techniques may be used to erase and/or to write to the storage medium to achieve a desired alignment of liquid crystal structure. The electrical technique relies on electric field to align the liquid crystal structure relative to, preferably in parallel with, the field. Alternatively, a magnetic field may be used with conventional means providing such field; in such case the magnetic field should be relatively strong and the liquid crystal preferably has positive magnetic susceptibility to align with the field. The optical technique provides thermal energy to enable the liquid crystal structure to be released from parallel aligned condition and, thereby, to assume a distorted or curvilinear aligned condition in the volume(s) thereof in the containment medium.

Ordinarily electrical techniques for altering alignment of liquid crystal structure are somewhat less accurate or precise than are optical techniques. Therefore, preferably electrical techniques are used to erase and optical techniques are used to write. Erasing can be carried out on a relatively large scale, e.g., in bulk whereby an entire line, track, sector, or all of a disc may be erased. However, individual bits of information typically would be written one at a time either by providing energy to an area of the storage medium where a bit of information is stored to cause a specific alignment of liquid crystal there or by not providing such energy there to allow the existing alignment of liquid crystal to continue to remain in effect; and, therefore, greater accuracy of input to the disc usually is required for writing than for erasing.

Current technology provides a higher degree of control for optical energy than for electrical energy, particular when the latter is a function of deposited charge and the generating of such charge. Therefore, to take advantage of such higher degree of control, it is preferred to write optically and to erase electrically. The reverse may be employed, though, if desired without departing from the spirit and scope of the present invention.

With the above brief summary and the detailed description presented below in mind, then, several electrical energy systems of the invention include a tip type electric charge applying system, a shielded tip type electric charge applying system, a wire discharge type charge applying system, an ion generating system and a corona generating system. Moreover, an optical energy (input system) with a mask for developing and applying optical input to an optical read/write system is another feature of the invention. Further, a composite arrangement for providing both electrical and optical inputs to the optical read/write storage medium is disclosed. Another aspect of the invention relates to use of pleochroic dye in the liquid crystal to absorb input electromagnetic radiation or energy to increase the efficiency of thermal energy transfer into the liquid crystal.

It will be appreciated that the various features and embodiments of the invention which are disclosed in and described with respect to various drawing figures may be used in connection or in combination with other embodiments and/or features of the invention.

The foregoing and other objects, features, aspects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustratives embodiments of the invention, these being indicative, however, of but several of the various ways in which the principles of the invention may be employed.

DESCRIPTION OF THE PREFERRED EMBODIMENT

Figure 1:
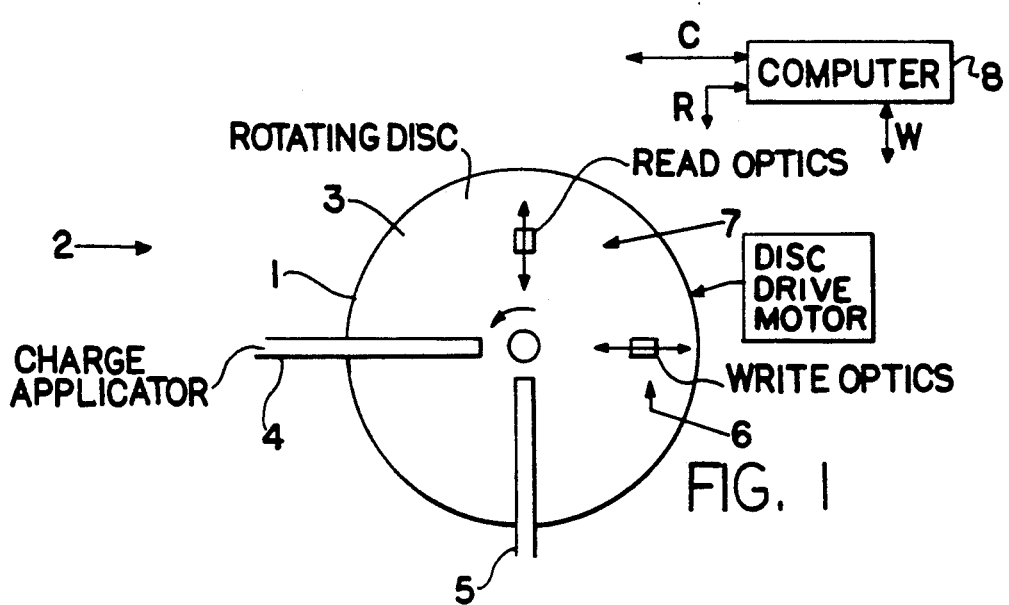
FIG. 1 is a schematic plan view of an optical read/write storage medium and system using the same in accordance with the present invention.

Referring to the drawings, wherein like parts are designated by like numbers in the several figures, a liquid crystal optical read/write storage medium 1 in accordance with the invention is shown schematically in FIG. 1. The optical read/write storage medium 1 is used in an optical memory system 2.

Briefly, according to the invention, the storage medium 1 is formed of liquid crystal material in a containment medium. The liquid crystal material is operative to produce a detectable condition, sometimes referred to as a response or output, most preferably a response or output that can be detected using optical techniques. Such response or output may be used to represent logic 1 and logic 0 signals for use in a computer or for other use.

In the preferred embodiment, which is described in detail herein, such optical output is the affect that the liquid crystal material has on incident light; in one condition of the liquid crystal material incident light may be scattered due to a mismatch of relevant indices of refraction, and in a second condition of the liquid crystal material, in which the relevant indices of refraction are matched, i.e., equal or about equal, incident light would be transmitted without any or at least without significant scattering. Whether incident light is scattered or is transmitted can be detected by optical means, such as a photosensor. Furthermore, the apparent detectable index of refraction characteristics of the liquid crystal material in the containment medium are a function of liquid crystal structural alignment in the containment medium, and such alignment can be controlled or altered by applying prescribed inputs to the liquid crystal material.

The invention uses plural volumes of liquid crystal material in a containment medium. The interface with the liquid crystal induces natural structure change, especially in the absence of a prescribed input. In the preferred embodiment, the containment medium is operative absent a prescribed input to distort the natural structure of the liquid crystal material to cause scattering of incident light. The liquid crystal, which may be smectic liquid crystal, preferably has a memory characteristic to maintain a particular structure or structural alignment even after a prescribed input thereto has been removed. However, as the result of a prescribed input, the liquid crystal structure may become aligned so as to reduce the amount of scattering. Thus, the structure and the optical operation of the invention is similar to the disclosures in several of the above-mentioned patents and application.

The optical read/write storage medium 1 includes a plurality of volumes of liquid crystal material in a containment medium. The optical read/write storage medium, for example, may be in the form of a disc 3 that has a circular plan view, as is seen in FIG. 1, and has a thickness characteristic according to several considerations described below.

Due to characteristics of the liquid crystal material itself and of the interactive characteristics of the liquid crystal material and the containment medium, incident light will be transmitted or scattered. Whether incident light is transmitted or scattered can be read using a photodetector, for example, so that, depending on the selected convention, two different states or conditions representing logic one and logic zero can be created.

As will become apparent from the description below, the invention may be used for storing data or information for computers and the like. The invention also may be used for storing video signals and/or audio signals or representations thereof, for example in digital format; examples of same include storage of data used in laser disc or video disc systems and data used in compact disc types of audio systems.

Preferably the optical read/write storage medium 1 uses smectic liquid crystal material. Smectic liquid crystal material has a structure that usually tends to align itself in layers such that the structure or structural alignment of the liquid crystal in a given layer may be parallel and the major axis of the liquid crystal structure may be perpendicular to the major directional extent of the layer containing the same. The layers of liquid crystal, too, tend to align generally in parallel with each other. These characteristics are well known and generally are referred to herein as the natural structure of the liquid crystal.

Preferably the containment medium which contains the volumes of liquid crystal material is optically transparent and has an index of refraction. Exemplary containment media are disclosed in the above-mentioned patents and applications. Such media include, for example, polyvinyl alcohol, latex, polyurethane, epoxy, resin, polymers, and so on. The containment medium preferably will not affect and will not be affected by the liquid crystal material. Also, preferably, the containment medium and/or a constituent thereof preferably has the optical characteristics described herein and has the ability through surface interaction with the liquid crystal to cause a distorting of the liquid crystal structure to a random alignment under the circumstances described further below.

The smectic liquid crystal material preferably is birefringent. The ordinary index of refraction of the liquid crystal, i.e. looking generally along the axis of the liquid crystal structure, preferably is matched to, i.e. is the same or about the same as, the index of refraction of the containment medium. The extraordinary index of refraction of the liquid crystal material, i.e. looking generally across the axis of the liquid crystal structure, preferably is different from the index of refraction of the containment medium.

When incident light is directed through the containment medium and through the liquid crystal material while being presented the ordinary index of refraction of the liquid crystal material, the containment medium and liquid crystal material appear to the incident light as a uniform medium having a common index of refraction and, therefore, light will be transmitted therethrough without (or with only minimal) distortion or refraction of such light.

On the other hand, when incident light is directed into the containment medium and then into the liquid crystal material while being presented the extraordinary index of refraction of the liquid crystal material, light will scatter at the interface of the containment medium and liquid crystal material and possibly also in the liquid crystal material itself. The walls or surfaces of the containment medium defining or bounding respective volumes of liquid crystal preferably are non-planar, most preferably curved. Such curvature further enhances such scattering.

The aforementioned transmitting or scattering of light can be detected using one or more photodetectors. Therefore, whether light is scattered or is transmitted by the liquid crystal material can be used to represent information.

One or more volumes of liquid crystal material in the containment medium may be used to represent a bit of information. For example, if light is transmitted by such liquid crystal bit B, the same may be said to be a logic zero; if light is scattered by such liquid crystal bit, the same may be said to be a logic one. Other logic conventions also may be used.

The light transmitting and light scattering properties of the liquid crystal bits on the disc 3 may be maintained or may be changed, even repeatedly, from one condition to the other. Thus, information can be written to and stored in a given liquid crystal bit B or group of bits and can be read out; and subsequently such liquid crystal bit (or group of bits) can be erased and/or written to again.

The optical memory system 2 includes the optical read/write storage medium 1, for example in the form of a disc 3, a charge applicator 4, a charge remover 5, write optics 6, and read optics 7. The disc 3 may be circular or other shape. Means, such as a motor M, are provided to rotate the optical read/write storage medium 1 disc 3, e.g., as in a conventional disc drive, so that all optical storage cells or bits thereof are cyclically moved past the several parts 4-7 of the optical memory system 2. Alternatively, the other parts may rotate while the read/write medium 1 disc 3 remains fixed. If desired, relative movement may be other than rotation. Also, the medium may take a form other than as a circular disc.

A computer 8 may be coupled to the charge applicator 4, write optics 6 and read optics 7 to erase the disc 3, to write information thereon and/or to read information therefrom. Connections C, W and R shown associated with the computer 8 may be made to the respective charge applicator 4, write optics 6 and read optics 7 of the system 2 to coordinate erasing of information, storing/writing storage of information, and/or reading of information with respect to the read/write storage medium 1 disc 3.

The charge applicator 4 may be an electrode that is selectively movable to various radii relative to the optical read/write storage medium 1 to apply electrical charge to respective surface areas of the optical read/write storage medium 1. Alternatively, the charge applicator 4 may be a solid state generally linear array intended selectively to be switched to apply charge to one or more selected surface areas. Preferably the charge applicator 4 extends over a full radius of the disc 3. If desired, the charge applicator 4 may apply charge to the surface of the disc 3 simultaneously along the entire length of the applicator as a part, sector, or the entire disc 3 rotates with respect to the applicator.

Charge application may be used, for example, to erase information stored in a liquid crystal bit. A ground electrode 10 is provided on the surface of the optical read/write storage medium 1 opposite the surface at which the charge applicator applies charge. The applied surface charge relative to the ground electrode 10 creates an electric field that aligns the liquid crystal material with respect to such field preferably such that the ordinary index of refraction is presented incident light. Therefore, such alignment can be used to permit transmitting of light through a particular liquid crystal bit or through plural bits. The ability to apply charge and at least temporarily to store charge on the surface of a material formed of volumes of liquid crystal in a containment medium is disclosed in the inventor's U.S. Pat. No. 4,603,945 mentioned above. Such surface charge may be used to develop an electric field across at least part of such material to achieve a preferred structural alignment of the liquid crystal therein, e.g., parallel to the field.

Although the applied charge itself may dissipate within short time after application to the surface of the optical read/write storage medium 1, a charge remover 5 may be provided to remove the surface charge after it has been applied adequately long to effect the desired alignment of liquid crystal structure. The charge remover 5 may be a brush-like device that grounds out or discharges any remaining surface charge. Preferably the nature of the liquid crystal material in a given liquid crystal bit is such that after the liquid crystal has been aligned by such an electric field, the liquid crystal structure will remain in such aligned condition even after removal of the electric field unless otherwise disturbed or altered, as is described further below. This is one memory characteristic, condition or mode of the optical read/write storage medium 1.

The charge applicator 4 and the charge remover 5 may be operated selectively to apply charge or not and selectively to remove charge or not during a given rotational cycle of the optical read/write storage medium 1 past the applicator and remover. Therefore, if no charge is applied to a given liquid crystal bit B during a given rotational cycle of the optical read/write storage medium 1, the logic zero or logic one condition of that liquid crystal bit will not be changed. On the other hand, in any given rotational cycle of the optical read/write storage medium 1, charge may be applied by the charge applicator 4 to a given liquid crystal bit to erase the same to the aligned liquid crystal structure mode.

According to the preferred embodiment of the invention, the charge applicator is used to apply charge to the entire disc or to an entire sector of the disc 3 to erase the same. Then the write optics 6 would be used to write new information to the disc or such sector, to rewrite information thereto, and/or to rewrite certain erased and certain new information thereto.

Write optics 6 of the optical memory system 2 is operative selectively to raise the temperature of the liquid crystal material in a given liquid crystal bit B to write information to the optical read/write storage medium 1. What the write optics preferably does is to raise the temperature of a given liquid crystal bit to a temperature that is above the isotropic point or clearing point of the liquid crystal material, thus releasing the aligned condition of the liquid crystal structure that had been forced by a previous application of electric field, as was mentioned above. After the liquid crystal material is allowed to cool to a temperature below the isotropic or clearing point temperature, the liquid crystal structure will tend to be reconstituted in a distorted alignment according to the non-linear or non-planar, preferably curved, extent of the wall of the containment medium volume containing the liquid crystal material. Such wall or the surface thereof, therefore, interacts and interfaces with the liquid crystal structure. Such distorted alignment of the liquid crystal structure will remain for a given volume thereof until the liquid crystal material is acted on by application of electric field or the temperature is raised above the isotropic or clearing point again (although upon cooling the distorted alignment condition will reoccur). This is the other memory characteristic, condition or mode of the optical read/ write storage medium 1. In a sense, writing also occurs by not causing distorted alignment to occur in certain bits, while others are, thereby creating plural bits at respective logic 1 and logic 0 conditions, for example.

The write optics 6 may include a laser and focusing optics to focus the laser light (which preferably includes energy in the infrared or near infrared wavelengths for heating) at selected locations on or in the optical read/write storage medium 1. (Other energy sources also may be substituted for the write optics and/or optical input provided thereby.) As is seen in FIG. 1, means (represented by a two-headed arrow) may be provided to translate the write optics to various radial locations relative to the optical read/write storage medium 1 to write information thereat. Alternatively, the write optics may include a device that extends over an entire radius of the disc 3, as was mentioned above for the charge applicator 4, and such device may include plural elements that could be selectively operated to write to one liquid crystal bit or simultaneously to more than one liquid crystal bit.

The read optics 7 is intended to read whether a particular liquid crystal bit is transmitting light or is scattering light and, therefore, whether the liquid crystal bit is at a logic zero or logic one condition. The read optics preferably includes a laser that produces a plane collimated light output and one or more photodetectors to detect whether light is transmitted and/or is scattered by a particular liquid crystal bit. Alternatively, the read optics may include a device that extends over an entire radius of the disc 3, as was mentioned above for the charge applicator 4, and such device may include plural elements that could be selectively operated to read one liquid crystal bit or simultaneously to read more than one liquid crystal bit.

As is seen in FIG. 1, the charge applicator 4, charge remover 5, write optics 6 and read optics 7 are located at ninety degrees relative to each other for convenience. However, other relative locations may be used with respect to the optical read/write storage medium 1, as may be desired for various reasons. Desirably the charge is removed, though, before the given part of the disc 3 reaches the write optics so writing can occur effectively and efficiently.

Figure 2:
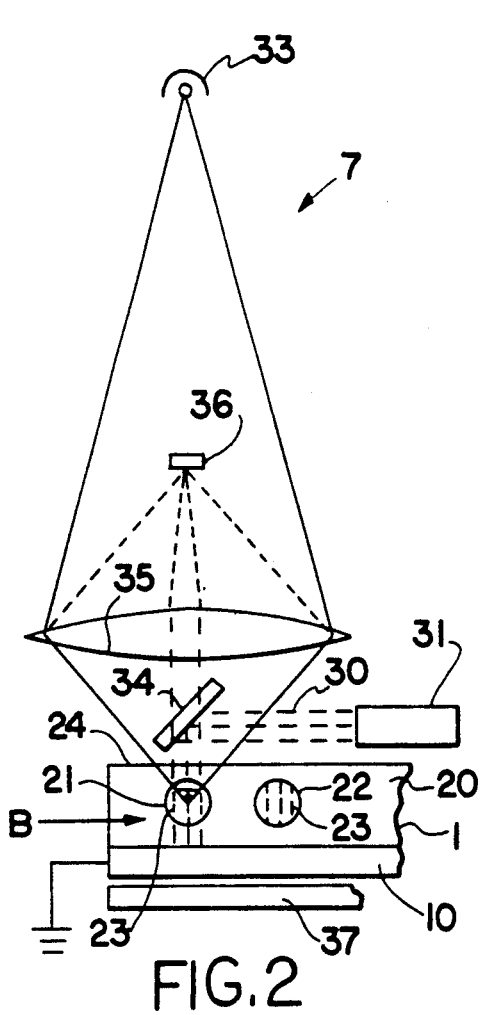
FIG. 2 is a fragmentary schematic elevation view of the optical read/write storage medium with the read optics not detecting light because light is not being scattered by a liquid crystal volume bit.
Figure 6:
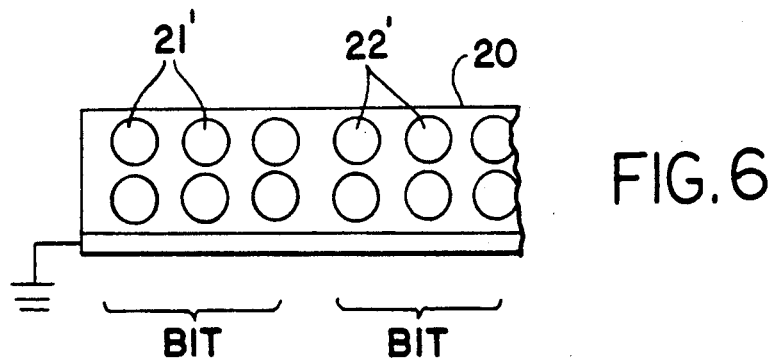
FIG. 6 is a fragmentary schematic elevation view of an optical read/write storage medium according to the invention employing several liquid crystal volumes to form a single information bit.

In FIG. 2 an enlargement of a section of the optical read/write storage medium 1 is shown with the read optics 7. Such enlarged section 20 includes two volumes 21, 22 of smectic liquid crystal material 23 in a containment medium 24. A ground electrode 10 is at one side of the containment medium; such ground electrode may be, for example, indium tin oxide material that is electrically conductive and optically transparent. For convenience of description below, unless otherwise noted, each liquid crystal bit is represented by a single volume 21, 22, etc. of liquid crystal material in the containment medium. However, it will be appreciated (and is represented in FIG. 6) that each liquid crystal bit may be composed of a plurality of volumes of liquid crystal material in the containment medium.

As is seen in FIG. 2, the liquid crystal structure is aligned in plural layers, and the liquid crystal structure in respective layers is in parallel aligned condition. Assuming such alignment provides matching indices of refraction of the liquid crystal 23 and containment medium 24 in the direction of propagation therethrough of incident read light 30 emanating from a laser 31 in the read optics 7, such read light 30 will be transmitted through the liquid crystal bit of the optical read/write storage medium 1 generally without scattering. That the light is transmitted without scattering can be detected by the read optics 7; specifically, the transmitted light does not reach the photodetector 33 and in fact is not detected, as is described further below. This may be considered a logic 0 condition, for example.

The read optics 7 includes the read laser 31, a beam splitter 34, a schlieren optics system having an objective lens 35 and a stop or mask 36 (sometimes referred to as a phase plate), and the photodetector 33. The read optics 7 arrangement reads whether light is scattered by or is transmitted through a liquid crystal bit B. The read laser 31 directs collimated light having a planar wavefront via a beam splitter 34 toward the liquid crystal bit B. Additional lenses, stops, filters, etc. also may be provided, if desired, to refine the light beam 30 to size, shape, color, etc. The lens 35 focuses parallel light received thereby onto the stop 36, and stop 36 prevents parallel light from reaching the photodetector 33. The stop 36 preferably is located at the image plane of the lens 35 to effect the desired light blocking function. Further, the source of such parallel light may be, for example, reflection from the top surface of the disc 3, reflection from the electrode 10, and/or reflection by a further reflector 37 at or spaced from electrode 10.

Figure 3:
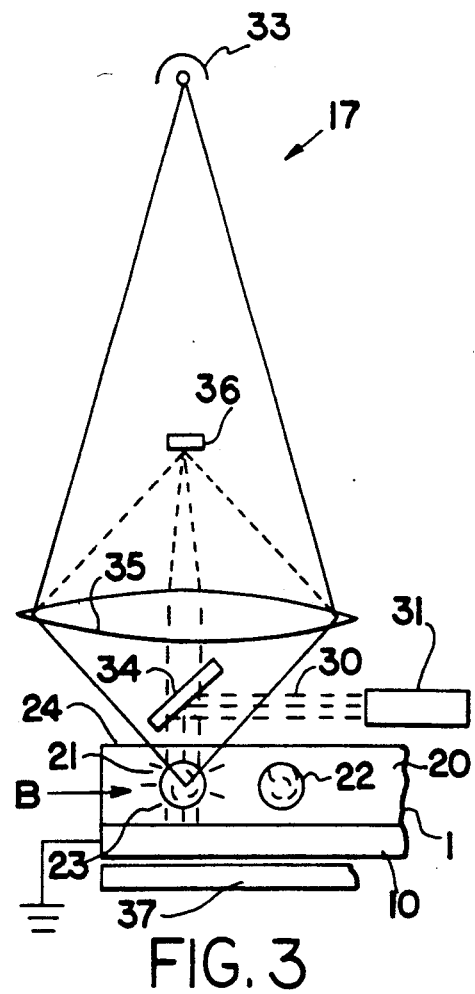
FIG. 3 is a fragmentary schematic elevation view of the optical read/write storage medium with the read optics detecting light scattered by a liquid crystal volume bit.

However, light scattered by the liquid crystal bit B would be directed by the lens 35 past the stop 36 and would be focused at the photodetector 33. Preferably the photodetector 33 and the volume(s) of liquid crystal forming a particular bit are located at respective conjugate foci of the lens 35. Such operation and positioning is seen in FIG. 3, wherein the liquid crystal structure is in distorted alignment. Assuming different indices of refraction of the containment medium and of the liquid crystal, as was mentioned above, input read light 30 generated by the laser 31 in the read optics 7 will be scattered at the interface between the liquid crystal material and containment medium and preferably also by the distorted liquid crystal material itself and the amount of light transmitted to the photodetector 33 will be increased over that occurring in the mode illustrated in FIG. 2. Such scattered light will be collected by the lens 35 and directed past the mask or stop 36 to the photodetector 33.

The optics of the read optics 7 generally follows the lens formula $1/F = 1/S_1 + 1/S_2$. Therefore, it is desirable to locate the photodetector 33 a distance $S_1$ from the lens and to locate the liquid crystal volume bit 21, for example, a distance $S_2$ relative to the lens. In this way light scattered by the bit will be directed past the lens 35 to the photodetector 33. Since the mask 36 is located at the focal point F of the lens 35 will result in the mask blocking parallel light received by the lens 35, the mask will block the mentioned parallel light from reaching the photodetector 33. Preferably the distance $S_1$ is larger than the distance $S_2$ to magnify what is on or is occurring on the disc 3 and to obtain a better separation of the light that is being blocked by the mask 36 and the light information being detected by the photodetector 33.

Figure 4:
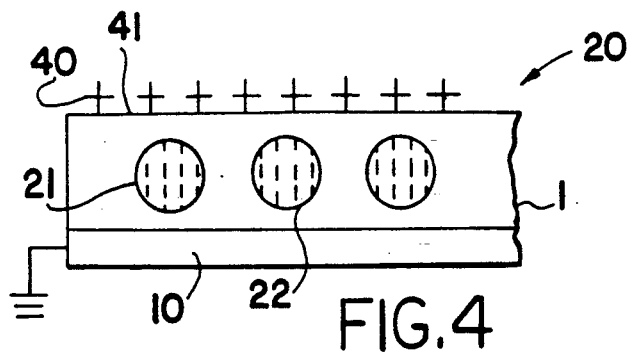
FIG. 4 is a fragmentary schematic elevation view of the optical read/write storage medium showing the effective application of electrical charge to erase information stored in the medium.

Looking at FIG. 4, an enlarged section 20 of the optical read/write storage medium 1 is shown. Electrical charge 40 has been deposited to the top surface 41 of the optical read/write storage medium 1 by the charge applicator 4. Such charge in cooperation with the ground electrode 10 creates an electric field that causes alignment of the liquid crystal structure with respect to the field, e.g., in parallel with the field, to achieve the matched index of refraction condition mentioned above.

Preferably the read light 30 (FIGS. 2 and 3) is not of such intensity or local concentration (at the liquid crystal volume(s) to which it is directed) as would affect the structural alignment or other characteristics of the liquid crystal material in the volumes 21, 22, etc. Therefore, preferably the read light 30 is collimated and unfocused to minimize intensity or concentration—in any event to minimize energy delivered to the liquid crystal volume(s). In contrast, the write light described below is intended to affect such structure and, therefore, preferably is focused at the respective liquid crystal volume(s) that form a given bit or bits.

Figure 5:
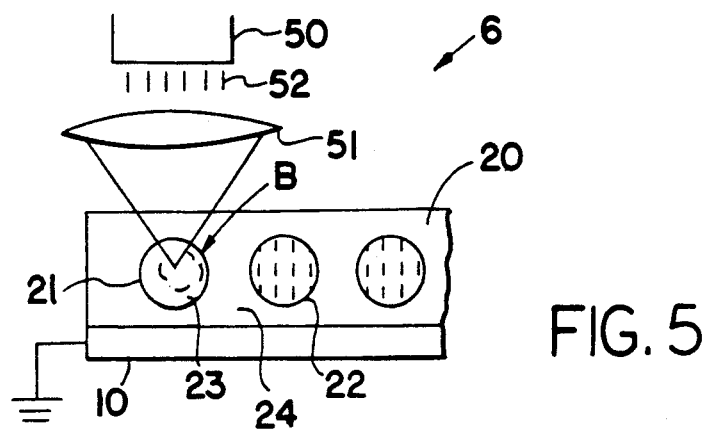
FIG. 5 is a fragmentary schematic elevation view of the optical read/write storage medium with the write optics shown writing to a liquid crystal volume bit.

Turning to FIG. 5, the write optics 6 is shown relative to an enlarged section 20 of the optical read/write storage medium 1 for providing energy thereto to effect a specified liquid crystal alignment. The write optics 6 is shown relative to a single liquid crystal bit B formed of one volume 21 of liquid crystal material 23 in the containment medium 24 but may be equivalently used to write to plural volumes forming one or plural bits. The write optics includes a write laser 50 and a focusing lens 51 that focuses the write laser energy, e.g., laser type light 52, onto the liquid crystal bit to raise the temperature of the liquid crystal material therein to the clearing point or isotropic temperature thereof. The reason for focusing the write light 52 is to effect adequate energy concentration at the liquid crystal bit for the desired heating and phase transition to isotropic phase (or from smectic to nematic phase, which is described in greater detail below) preferably without affecting bits where no structural change is desired.

When the liquid crystal material in the volume(s) of the liquid crystal bit B being heated exceeds the isotropic or clearing point, including satisfying both the temperature and enthalpy requirements, the liquid crystal material loses its structural integrity thus releasing the parallel aligned condition thereof (if in fact such condition had previously existed). However, upon cooling to a temperature below the clearing point, the liquid crystal structure is reconstituted; and due to the distortion effected by the curved walls of the containment medium defining the volumes of liquid crystal material, such liquid crystal structure is distorted from the parallel relation mentioned previously.

The clearing point phase transition is a function of both temperature and the enthalpy characteristics of the liquid crystal material itself to achieve phase transition to isotropic phase after the clearing point temperature has been achieved. Preferably the write lens 51 is a high aperture number lens to achieve accurate focusing of the write light 52 precisely where energy concentration is desired to obtain the needed energy input for phase transition and to minimize affect on adjacent volumes of liquid crystal material or bits.

The read optics 7 (FIG. 3, for example) may be used to read or to detect light scattered by the liquid crystal bit B of FIG. 5.

Each liquid crystal bit B of the optical read/write storage medium 1 may be composed of a single volume 21, 22 of liquid crystal material in a containment medium, as is depicted in FIGS. 2, 3 and 5, or may be composed of plural volumes 21', 22' of liquid crystal material in a containment medium, as is depicted in FIG. 6. Preferably the storage medium 1 contains a plurality of bits that can be written to, read, erased, etc.

For the erasing mechanism, namely the charge applicator 4, the magnitude of electrical charge that needs to be placed at the surface of the read/write storage medium 1 may be on the order of about 0.1 microcoulomb per square centimeter. Such energy or charge requirement is based on application of a 100 volt electric field (an approximate voltage value determined experimentally, for example, in Examples 2-5 hereof) and a thickness of a layer of liquid crystal volumes on the order of about 1 micron.

As a practical matter, the read/write storage medium 1 may have a thickness of about ten microns with volumes of liquid crystal material distributed throughout such thickness. Each volume may have a diameter on the order of about 1 micron, for example (although this number is not intended to be limiting, and volumes of larger or smaller size may be employed, e.g. depending on materials used, operation desired, density of information storage desired, manufacturing techniquies, and so on). To optimize accuracy according to the invention it is desirable to write and to read only with respect to the top layer of volumes of liquid crystal material or the several layers of volumes of liquid crystal material that are located proximate the surface of the read/write storage medium 1 nearest the read and write optics. In this regard, each such active layer(s) used for storing information and able to be read out may be on the order of about one micron thick.

Using the write optics 6, the write laser light 52 is emitted in a relatively wide beam. The focal point of the lens 51 preferably is at the surface layer of liquid crystal material (1 micron thick) so that the write light is focused over a relatively large solid angle to a precise location in the center of a liquid crystal bit. Preferably the lens 51 has a high numerical aperture for increasing energy density of the write laser light 52.

If desired, the depth in the read/write storage medium 1 of the focal point of the lens 51 may be deeper than just the immediate surface area of the read/write storage medium 1 so that writing to a liquid crystal bit below the top layer liquid crystal bit is possible. It would be possible to write such a submerged liquid crystal bit even though the surface liquid crystal bit is in scattering mode because the incident write light from the write laser enters at a relatively large solid angle providing a large wavefront that will not be substantially attenuated or scattered by the scattering surface liquid crystal bit. In any event, adequate amount of energy can be directed and focused in the submerged liquid crystal bit to effect writing thereto.

Thus, the lens 51 of the write optics importantly cooperates with the write laser 50 to assure that there is adequate energy density at the liquid crystal bit intended to be written to. More specifically, such energy density should be adequate to provide enough energy to take the liquid crystal material in the given liquid crystal bit being written to above the isotropic phase transition.

The resolution of the present invention is extremely high. Importantly, since the difference between a liquid crystal bit written to or being written to and one not being written to may be primarily a function of the enthalpy of phase transition, the temperature of the liquid crystal material in a liquid crystal bit being written to and the temperature of an adjacent liquid crystal bit not being written to can be the same or essentially the same; the only difference between the two liquid crystal bits would be being the amount of additional energy provided by the write laser 50 and focused by the lens 51 to bring the liquid crystal bit being written through the isotropic phase transition. Since there preferably is no temperature gradient between the liquid crystal bit being written to and a liquid crystal bit adjacent thereto, there will be no thermal conduction therebetween; i.e. the write pattern will not spread to adjacent liquid crystal bits. As a result it is possible to write directly to one liquid crystal bit without having a consequential impact on an adjacent liquid crystal bit, thus providing extremely high resolution and capability of positioning liquid crystal bits in very close proximity to each other.

Techniques disclosed in the above-mentioned U.S. patents and patent applications may be used to make the storage medium 1.

EXAMPLE 1

Applicant has discovered that in view of the foregoing, it would be possible to have a liquid crystal bit density on a read/write storage medium 1 on the order of one liquid crystal bit per square micron of area. Using approximations, then, such density could achieve about 625 bits per square mil (square thousandth of an inch). Considering a sixteen bit word (16 bit byte), then, it would be possible to have approximately 40 bytes per square mil (square thousandth of an inch). On a per square inch basis, one would have about $4 \times 10^7$ bytes per square inch; or on the order of about 5,000 megabytes per square foot of storage in the read/write storage medium 1. The foregoing presumes using only the surface layer for liquid crystal bits. However, the data storage could be doubled, for example, by using both the surface layer and one (or even more) below that for liquid crystal bit data storage.

Furthermore, by maintaining the read/write storage medium 1 at a temperature that is about ten degrees C. below the isotropic phase transition temperature, to effect writing to any given liquid crystal bit the energy required to write that liquid crystal bit would only be that needed to raise the temperature ten degrees C. plus an additional amount of energy for the enthalpy to achieve the phase transition.

It is anticipated that the total amount of liquid crystal material required to provide liquid crystal bits in one layer thereof on a one square foot read/write storage medium 1 having 5,000 megabytes would be on the order of about 0.1 gram. Calculations show that to write to the entire read/write storage medium 1 of 5,000 megabytes would require only about 0.1 Joule. Indeed, the amount of energy to write to a single liquid crystal bit would be on the order of about $1.25 \times 10^{-12}$ Joule. Therefore, writing functions could be carried out using, for example, a relatively small laser of, for example, 10 milliwatts.

The small amount of energy required to write to a liquid crystal bit and the reliance on enthalpy of phase transition to complete a writing step to one liquid crystal bit while avoiding spill over to another adjacent liquid crystal bit further assures that the read/write storage medium 1 will have extremely high liquid crystal bit density and extremely accurate resolution with relatively low error rate.

Several formulations of smectic liquid crystal material may be used in accordance with the present invention. Other liquid crystal materials also may be used. An important criterion for selecting the liquid crystal material, and particularly the smectic liquid crystal material, is that the liquid crystal material have a memory capability to retain structural alignment characteristics even after the prescribed input that forced the structural alignment characteristics has been terminated. The liquid crystal material should be birefringent or have another quality that permits the alignment characteristics thereof to be read out, e.g. using the optical means described herein. Additionally, preferably the liquid crystal structure should be capable of assuming a distorted alignment condition as a function of interaction with the curved wall (or other non-straight or non-parallel wall) of the containment medium containing the same.

Smectic liquid crystal material has the aforementioned characteristics. Therefore, it is desirable that the liquid crystal material used in accordance with the invention be operatively smectic in also having at least some, if not all, of such characteristics even though not necessarily being purely smectic material. Thus, for example, liquid crystal material that includes both smectic liquid crystal and nematic liquid crystal may be considered operationally smectic.

Exemplary smectic or operationally smectic liquid crystal materials that may be used in accordance with the present invention include the following four materials, each of which is comprised of the stated proportional recipe for making same. Abbreviations are used for space minimizing, as follows:

K-24 is the following material: 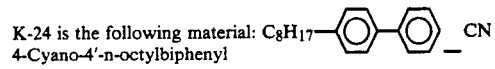
4-Cyano-4'-n-octylbiphenyl

K-30 is the following material: 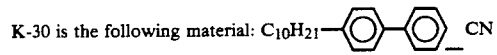

K-36 is the following material: 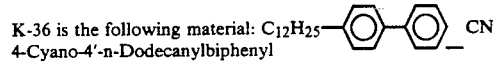
4-Cyano-4'-n-Dodecanylbiphenyl

The foregoing three materials with the "K" prefix are sold by British Drug House (BDH).

2LI-1844 is nematic liquid sold by E. Merck.

| Material 1: | K-24 | 13.9% |
|---|---|---|
| | K-30 | 26.6% |
| | K-36 | 29.5% |
| | 2LI-1840 | 30.0% |

Thus, it will be appreciated that the Material 1 is comprised of the four liquid crystal material ingredients identified just above in the recipe for such Material 1, such ingredients being provided proportionally by weight according to the indicated percentages.

| Material 2: | K-24 | 19.2% |
|---|---|---|
| | K-30 | 38.4% |
| | K-36 | 42.4% |
| Material 3: | K-24 | 16.6% |
| | K-30 | 33.2% |
| | K-36 | 36.7% |
| | 2LI-1844 | 13.4% |
| Material 4: | K-24 | 17.1% |
| | K-30 | 34.2% |
| | K-36 | 37.6% |
| | 2LI-1844 | 11.0% |

An exemplary containment medium according to the invention is polyvinyl alcohol (PVA) number 107 sold by Air Products Corporation (AIRCO). Such material is a high hydrolysis material. Other materials for containment medium also may be used, as are disclosed, for example, in the above-mentioned patents and application. Various methods for making the volumes of liquid crystal material in a containment medium also are disclosed in such patents and application; and such methods may be used according to the present invention to make the medium 1, for example.

One technique for making the volumes of liquid crystal material in a containment medium includes mixing the liquid crystal material and containment medium material and perhaps some other ingredients together to form an emulsion or dispersion consistency. The mixture is allowed to cure leaving the desired volumes of liquid crystal material formed within the containment medium. Alternatively, individual capsule-like volumes, e.g. of spherical or other shape, may be formed of the liquid crystal material and containment medium; and the capsules may be placed on a support substrate for retention thereon to form the storage medium 1, generally as is disclosed, for example, in the '047 patent.

The storage medium 1 may be formed of liquid crystal material comprising from about 30% to about 60% thereof and of a containment medium comprising from about 40% to about 70% thereof. It is possible that other ratios of such ingredients and possibly other ingredients, as well, may be used for the storage medium 1. Percentages are by weight.

EXAMPLE 2

An optical read/write storage medium of the type described herein was made by mixing together liquid crystal Material 1 above and the 107 PVA mentioned above in the ratio of about 60% liquid crystal to about 40% PVA. Procedures of the type disclosed in the above patents and applications were followed to make the storage medium. The cured storage medium was about 8 microns thick.

In operation of such storage medium there was experienced a smectic to nematic transition at about 44.2 degrees C.; and the isotropic point was reached at about 59 degrees C. Thus, there first appeared to be the mentioned transition from smectic to nematic material; and then isotropic clearing occurred at a higher temperature. After reaching such isotropic point, the storage medium was allowed to cool and the liquid crystal material assumed the distorted alignment condition described herein to scatter light. Saturation voltage was somewhat less than about 100 volts at which voltage parallel alignment of the liquid crystal material occurred and scattering of incident light was reduced. Fading occurred, and, therefore, degree of memory retention was not optimum.

EXAMPLE 3

The procedures and materials of Example 2 were followed, except that liquid crystal Material 2 was substituted for the Material 1 mentioned in Example 2.

In operation of such storage medium no smectic to nematic transition was experienced; no nematic phase was encountered. The isotropic point was reached at about 52 degrees C. Saturation voltage was about 140 volts. Operation otherwise was generally as was described above in Example 2; however, no fading was experienced. Therefore, memory retention characteristics of the storage medium made in accordance with Example 3 appeared extremely good.

EXAMPLE 4

The procedures and materials of Example 2 were followed, except that liquid crystal Material 3 was substituted for the Material 1 mentioned in Example 2. The storage medium made was about 4 microns thick.

In operation of such storage medium the smectic to nematic transition was experienced at about 45.3 degrees C. The isotropic point was reached at about 48.7 degrees C. Saturation voltage was about 40 volts. Operation otherwise was generally as was described above in Example 2; there was some fading, but not as much as in Example 2. Therefore, memory retention characteristics of the storage medium made in accordance with Example 4 were better than as in Example 2 but not as good as in Example 3.

EXAMPLE 5

The procedures and materials of Example 2 were followed, except that liquid crystal Material 4 was substituted for the Material 1 mentioned in Example 2. The storage medium made was about 6 microns thick.

In operation of such storage medium the smectic to nematic transition was experienced at about 47.2 degrees C. The isotropic point was reached at about 49.4 degrees C. Saturation voltage was about 70 volts. Operation otherwise was generally as was described above in Example 2; there was some fading, but not as much as in Example 2. Therefore, memory retention characteristics of the storage medium made in accordance with Example 4 were better than as in Example 2 but not as good as in Example 3.

Figure 7:
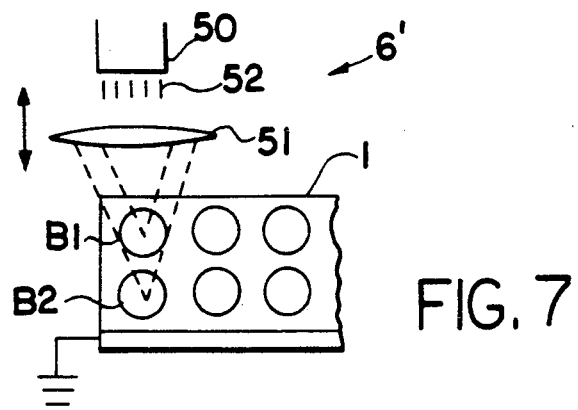
FIG. 7 is a fragmentary schematic elevation view of an alternate embodiment of the optical read/write storage medium system with multi-layer write capability.
Figure 8:
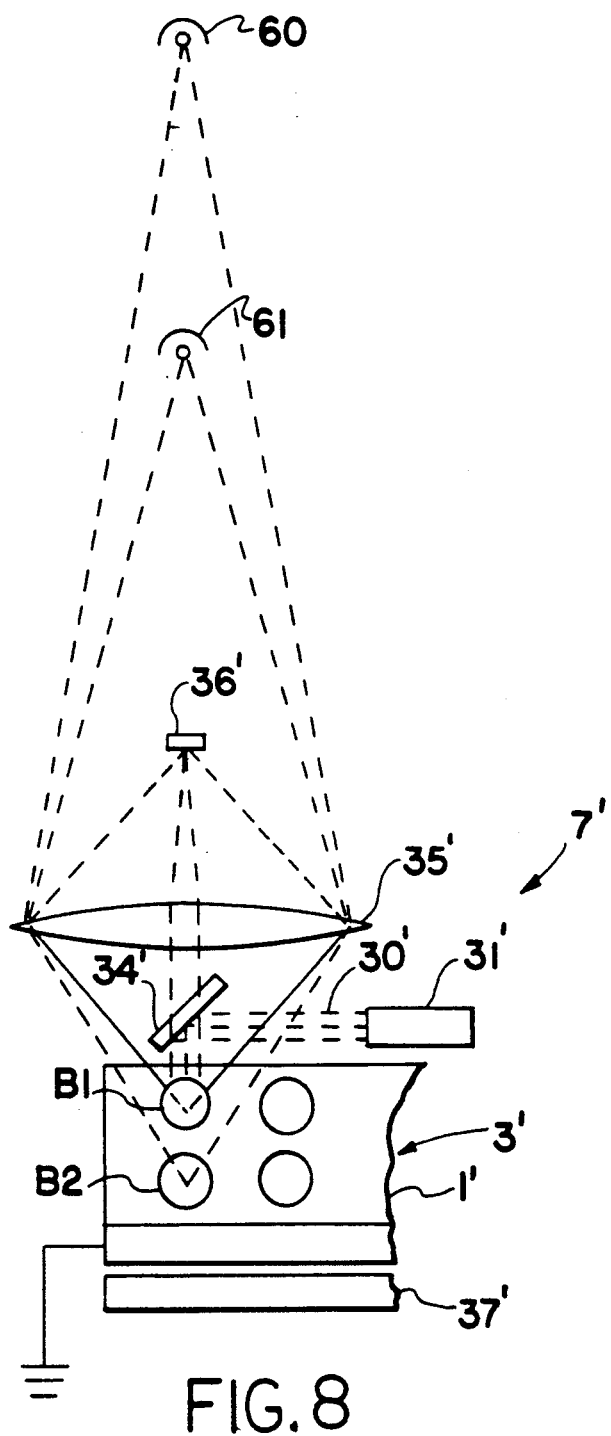
FIG. 8 is a fragmentary schematic elevation view of an alternate embodiment of the optical read/write storage medium system with the multi-layer read capability.

Briefly referring to FIGS. 7 and 8, these show multiple depth information storage and retrieval in the optical read/write storage medium 1'. Primed reference numerals in FIGS. 7 and 8 designate parts that are similar to those discussed above and are identified by corresponding unprimed reference numerals. In particular, the liquid crystal bits B1, B2 may be effectively stacked in several layers in the optical read/write storage medium 1' so that one layer of liquid crystal bits is near the top surface of the optical read/write storage medium 1' disc 3'; another layer of liquid crystal bits is below the first, and so on. As is seen in FIG. 7, the depth at which the write optics 6' laser 50 light 52 is focused in the optical read/write storage medium 1' can be varied, e.g. by moving the lens 51 relative to the optical read/write storage medium 1' thereby to write to a given layer in the optical read/write storage medium 1', e.g. to bit B1 in one layer or to bit B2 in another layer. Conventional means symbolized by the arrow 51a may be employed to effect accurate movement of the lens 51 so that the collimated write laser light 52 will be focused to adequate concentration at a particular layer or depth in the medium 1' to effect the desired isotropic transition for writing information to the particular bit or bits in the given layer. It is possible to write to only a layer below the top layer of liquid crystal volumes even without writing to the top layer or layers above the one being written to by altering the point at which the write laser light is concentrated. For example, as is seen in FIG. 7, the write light may be focused at bit B2 to write thereto; and in such case is not adequately concentrated in bit B1 to effect writing to the latter. Although this embodiment is shown with two layers, the invention may have more than two.

Figure 10:
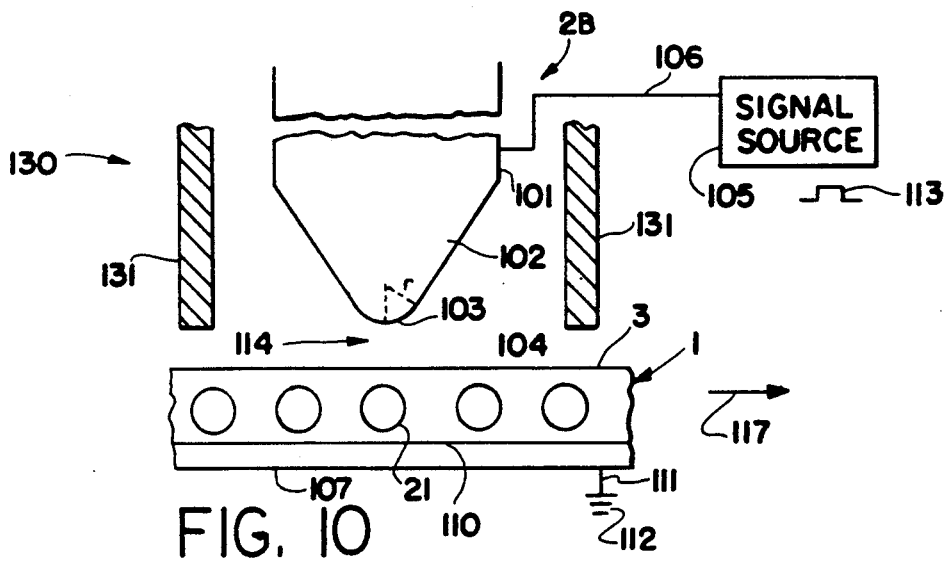
FIG. 10 is a fragmentary schematic elevation view of a shielded tip type electric charge applying system in an optical read/write system.

In FIG. 8 is shown read apparatus 7' for reading the information stored at different respective depths or in different respective layers in the indicated section 20' optical read/write storage medium 1'. The apparatus in FIG. 10 is similar to the read apparatus 7' described above except that due to the two different depths at which information is stored, two different photodetectors 60, 61 may be used on the back side of the objective lens 35' so that the photodetectors 60, 61 are operative simultaneously respectively to detect light from the respective liquid crystal bits B at the respective depths. Alternatively, if desired, one photodetector may be used and either it, the lens 35' or both may be moved to read at respective depths in the medium 1'.

Additional Charge Application Techniques

Several additional embodiments of charge deposition systems useful in the present invention are described below. Such charge deposition systems may be used individually or in combination in the optical read/write systems of the invention. Moreover, as will be evident from the description below, such charge depositions may be used for relatively point application of charge, the point possibly being expanded to a track about the medium 1 or disc 3; and in some circumstances the charge depositions may be more or less in bulk whereby charge may be deposited simultaneously to large areas of the disc 3.

Figure 9:
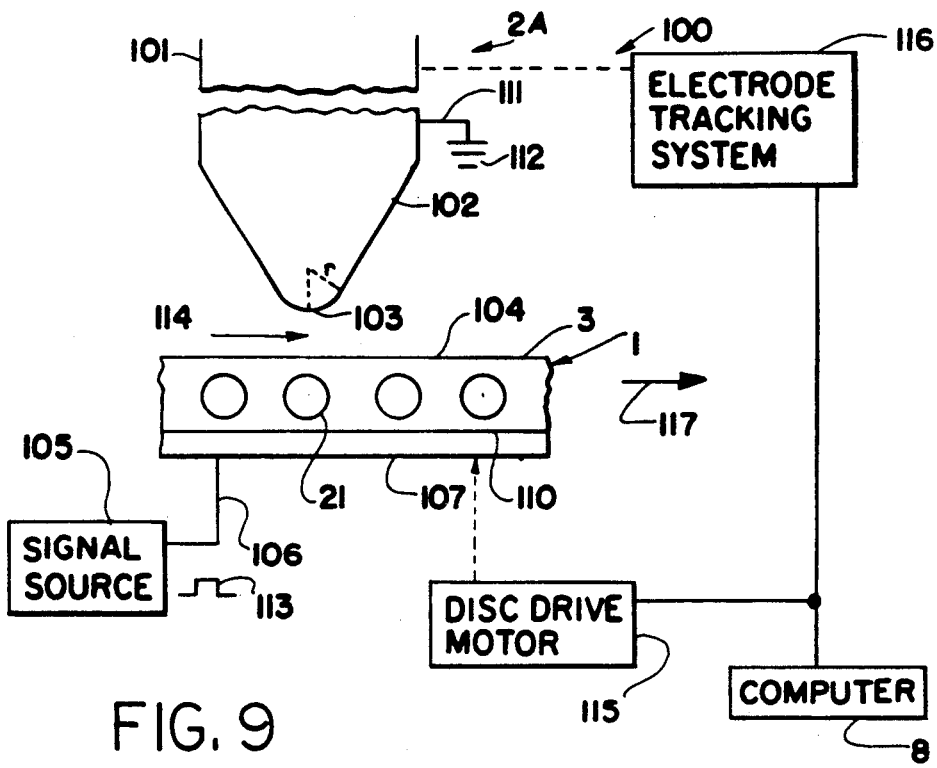
FIG. 9 is a fragmentary schematic elevation view of a tip type electric charge applying system in an optical read/write system.

Turning, now, to FIG. 9, a pointed tip electrode system 100 for applying electric charge to an optical read/write storage medium 1 according to an embodiment of the invention is illustrated in conjunction with an overall optical read/write information storage system 2A. Thus, the pointed tip electrode system may be used for the charge applicator 4 illustrated in FIG. 1, for example.

The pointed tip electrode system 100 includes an electrode 101, which has a pointed tip 102, the end 103 of which is positioned in close proximity facing relation to the surface 104 of the medium 1. The electrode 101 may be a solid cylindrical type of structure, e.g. as in a fine needle or the like. The electrode 101 is shown schematically in elevation in the drawings hereof. The medium 1 preferably is in the form of a disc 3, as was described above with reference to FIG. 1; hereinbelow the terms medium 1 and disc 3 may be used interchangeably.

The pointed tip electrode system 100 also includes an electrical signal source 105 which is electrically coupled by a connection 106 to an electrode 107 at a surface 110 opposite the surface 104 of the medium 1. Such electrode 107 may be an electrode layer that extends over the entire surface 110 of the medium or may be representative of a plurality of such electrodes each of which, or at least a plurality of which, preferably are electrically coupled to the electrical signal source 105. An electrical connection 111 is provided the electrode 101. In a preferred embodiment, the electrode 101 is coupled to a source of ground reference potential 112, and an electrical signal, such as a positive voltage square wave 113, is provided the electrode 107. Alternatively, it is possible for the signal source 105 to be connected to the electrode 101 and the electrode 107 to be connected to ground, although this arrangement, which is described further in detail below, is less preferred.

In operation of the pointed tip electrode system 100 of FIG. 9, the electrode 101 is maintained at ground reference potential and the electrode signal 113 is applied the electrode 107. If there is adequate conductivity through the medium 1 and the air 114 directly between the medium surface 104 to the tip end 103, a net charge will be drawn up to the surface 104 and will flow to the tip end 103. More specifically, when the signal 113 is applied the electrode 107, the air 114 between the tip end 103 and a proximate part of the surface 104 will ionize and there will be a net charge flow; the tip end 103 must be adequately close to the medium 1 to obtain such charge flow. The electrode 101 then extracts some of the charge from the surface 104. The effect of electric field creating the net current flow mentioned and/or the leaving of some charge on the surface 104 after the signal 113 has terminated. The surface charge is the source of electric field across the medium 1 relative to the electrode 107 that would be at ground when the signal 113 has terminated to cause the structure of that liquid crystal which is in proximity and subject to such field to align in parallel therewith.

The magnitude of electric field needed to effect such charge flow is a function of the ionization breakdown voltage of air, of the distances between the electrode tip end 103 from the surface 104 of the medium 1, and of the impedance characteristics of the medium 1. Moreover, in view of the fact that the electrode tip end 103 is spherical or near spherical and the surface 104 is planar or substantially planar, such electric field magnitude also is an inverse function of the radius of curvature r of the tip end 103, i.e. the field magnitude is a function of $1/r$. Therefore, the finer the point of the tip end 103, the greater the concentrating effect of applied electric field and the smaller the magnitude of voltage needed to achieve the desired result of aligning the liquid crystal structure.

The ionization breakdown voltage for air is on the order of 14,000 volts/cm. However, using a tip end 103 that has a radius of curvature r that is on the order of about 1 micron, a signal 113 of an amplitude of only about a one hundred or few hundred volts would be adequate to achieve the electric field concentration required to obtain a net charge flow and alignment of liquid crystal structure. Such voltage also may be smaller than a few hundred volts depending on the above-mentioned parameters. The mentioned size of tip end 103 and voltage magnitude are exemplary, and it will be understood that other tip end sizes and voltages may be used in accordance with the invention.

The actual field across the liquid crystal is a function of the amount of charge deposited on the surface 104; by controlling the amount of charge, the voltage of the field can be controlled, e.g., according to the formula $C=Q/V$, in which C is capacitance, Q is charge and V is voltage. Usually capacitance remains constant for a given set of conditions, e.g., materials, spacing, etc. Therefore, by regulating current, to which the Q term is related, as is well known, field voltage can be controlled, thereby to control the liquid crystal structure.

As is seen in FIG. 9, the system 2A includes a disc drive motor 115 and an electrode tracking system 116, both of which may be conventional devices typically used on conventional floppy disc drives or fixed (hard) disc drives. The motor 115 also may include associated circuitry, cabinetry, support mechanisms, etc., and, of course, the tracking system 116 also may include associated circuitry, motor(s), and support mechanisms, all of which may be generally of conventional design. The motor 115 moves the medium 1 (preferably in the form of a circular generally planar disc) relative to the electrode 101 by rotating such disc—arrow 117 demonstrates such movement; alternatively, although less desirably, the motor 115 may move the electrode 101 relative to the medium 1. The objective of the motor 115, though, is to effect continuing cyclical relative movement between the electrode 101 and medium 1.

The tracking system 116 is operative, as are conventional tracking systems, to move the electrode 101 radially with respect to the medium 1, e.g., so that the electrode 101 can effect application of electric field at various radial locations on the medium 1—since the disc 3 moves to the right relative to the illustration of FIG. 9, such radial movement of the electrode 101 would be, for example, in a direction into and out of the plane of the paper on which the drawing is presented. Preferably there is coordination of efforts of the motor 115 and tracking system 116 by the computer 8 (FIG. 1) to assure that the correct area of the medium 1 is erased, for example, by the electrode system 100.

The pointed tip electrode system 100 may be used to erase the medium 1 or part thereof and/or to write information to the medium 1. However, as was mentioned elsewhere herein, it is preferred to erase using an electrical system and to write using an optical system in order to take advantage of the usually greater degree of accuracy of the latter. The pointed tip electrode system 100 operates to apply electric field to liquid crystal in the medium 1 to align liquid crystal structure. Such electric field may be applied to a small amount of such liquid crystal, e.g., to a single volume 21 or 22 (FIG. 4) thereof, or simultaneously to a plurality of volumes of liquid crystal, depending on the size of the tip end 103 and of the volumes and also depending on whether or not there is relative movement of the tip end 103 and the medium 1 during application of electric field.

Using the pointed tip electrode system 100, the computer 8 coordinates motor 115, tracking system 116, and signal source 113 to apply electric charge and electric field where desired on the disc 3. Such input may be applied on a volume 21 by volume basis, although more preferably such input would be applied to a circular track or part of such a track of the disc 3. The annular width dimension of such a track may be approximately the diameter of the electrode tip end 103; and in any event such dimension would be a function of the width of effective electric field applied by the electrode 101 to the disc 3 during relative movement thereof. If desired, the information contained in a particular track may be read and stored in memory of a computer; thereafter, such track may be erased; and still later, information may be rewritten to part or all of such track—such information may be the same as that just erased (e.g., having been stored in other memory temporarily), partly same and partly new or revised information, or completely new information, and, if desired, some of the track may not be rewritten at all.

The pointed tip electrode system 100 also may be used to erase more than one track on the disc in a particular operation. In such case, the electrode tracking system 116 may be used to move the electrode 101 to a first radial position to erase one track or part thereof during one complete revolution of the disc 3; then the tracking system may move the electrode to a second radial position to erase another track or part thereof. Such tracks and/or parts thereof can be subsequently rewritten with information. Furthermore, if the diameter of the tip end 103 were adequately large relative to a smaller annular size of a track on which the write optics 6 (FIG. 1) may write, more than one track may be erased per revolution of the disc 3. Also, if desired, the pointed tip electrode system 100 may include more than one electrode 101 to erase more than one track simultaneously.

The signal 113 may be a high frequency or a low frequency or a relatively steady state DC pulse, e.g., of square wave, sinusoidal wave or other shape. However, if the frequency of such signal is relatively high, say on the order of those frequencies used for video signals, then the disc 3 could have substantial capacitance, which may be undesirable. To overcome the problems associated with such capacitance, it would be desirable to subdivide the electrode 107 on the surface 110 of the disc 3 into a plurality of electrode segments. Another solution to help overcome such problem would be to provide the signal 113 to the electrode 101 rather than to the electrode 107; although this solution is less preferred because of the possibility of plasma breakdown and/or electrical noise generation.

Turning, now, to FIG. 10, a modified pointed tip electrode system 130 for applying electric charge to an optical read/write storage medium 1 according to another embodiment of the invention is illustrated in conjunction with an overall optical read/write information storage system 2B. The modified pointed tip electrode system 130 is similar to the pointed tip electrode system 100 described above with reference to FIG. 9, except for two primary differences. First, the signal source 105 is coupled to the electrode 101 while the electrode 107 is coupled to ground, and, second, an electrically conductive shield 131 is provided about the electrode 101, especially in the vicinity of the tip end 103. Thus, the shield 131 may be, for example, a hollow cylinder in which at least part of the electrode 101 is located. The shield should be electrically conductive, and, therefore, may be made of metal or of other material that has the desired electrical conducting and electrical shielding functions.

Operation of the modified pointed tip electrode system 130 would be substantially the same as operation of the electrode system 100 described above. However, in the modified electrode system 130 the shield 131 shields the electrode 101 from extraneous noise and prevents emission of noise from the electrode 101. Due to such shielding, a greater accuracy of control of the electric field at the tip end 103 is possible so as to provide control of the erasing electric field and to avoid damage to the tip end and/or to the disc 3, e.g., due to plasma discharge or the like.

Figure 11:
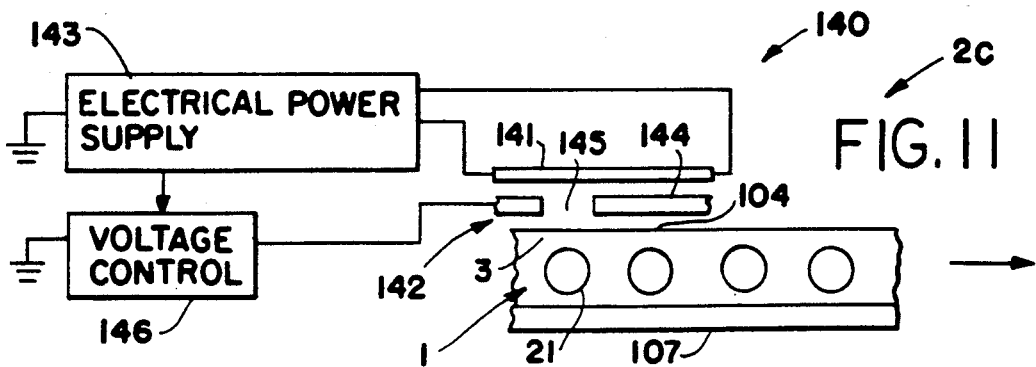
FIG. 11 is a fragmentary schematic elevation view of a wire discharge type electric charge applying system in an optical read/write system.

Referring to FIG. 11, a wire discharge electrode system 140 for applying electric charge to an optical read/write storage medium 1 according to another embodiment of the invention is illustrated in conjunction with an overall optical read/write information storage system 2C. The electrode system 140 includes an electrical wire 141 to spray electrical charge onto the surface 104 of the medium 1 and a control electrode arrangement 142 for focusing and controlling the charge from the wire 141 deposited on the medium 1. Such focusing and controlling can be functions of geometry of the control electrode arrangement 142, including both sizes and spacings, and relative geometry of the wire 141 and the control electrode arrangement 142 as well as of the voltages and currents used.

The wire 141 is connected to a electrical power supply 143 which provides an electrical voltage to the wire to serve as a source of electrons and effectively to energize the wire 141 to generate a corona from which such electrons are derived. If desired, the power supply 143 also may provide means to vary such voltage and/or means to heat the wire to facilitate and/or to control the emission of electrons. Further, the control electrode arrangement 142 may be in the form of an electrically conductive plate 144 having an opening 145 therethrough. The plate 144 may be a solid plate having one or more openings 145 through it or may be formed of a plurality of separate plate-like elements 144a, 144b, which can be moved relative to each other to alter the size of the opening 145 for controlling the focusing of electrons onto the surface 104 of the medium 1.

A voltage control 146 couples the power supply 143 to the plate 144 to control the voltage of the plate relative to the wire 141, thereby to control the emmission of electrons from the wire. At least some of such emitted electrons would travel through the opening 145 to the surface 104 of the medium to set up an electric field with respect to the grounded electrode 107 thereby to align liquid crystal structure subjected to the field.

In the system 140 the electrical power supply 143 and/or the voltage control 146 may be coupled relative to the same source of ground reference potential 112 to which the electrode 107 of the disc 3 is coupled. Then, by varying voltage of the wire 141 and/or the electrode plate 144 relative to the ground 112, further control of the electron emission and/or attraction to and deposition on the surface 104 can be achieved.

If desired, the plate 144 may be replaced by plural electrode elements, e.g., as vanes of an iris, diaphragm or aperture for a photographic camera, that are positioned in generally coplanar relation and are spaced apart a distance for defining the opening 145. By effecting relative movement of such electrode elements the size of the opening 145 can be altered and the flow and focusing of the electron flow through such opening can be controlled. As another alternative, the spacing between the wire 141 and the electrode arrangement 142 may be altered to provide such control function. As still another alternative, a plurality of crossed wires forming a grid-like arrangement may be substituted for the plate 144 to provide the functions of the control electrode arrangement 142.

Figure 12:
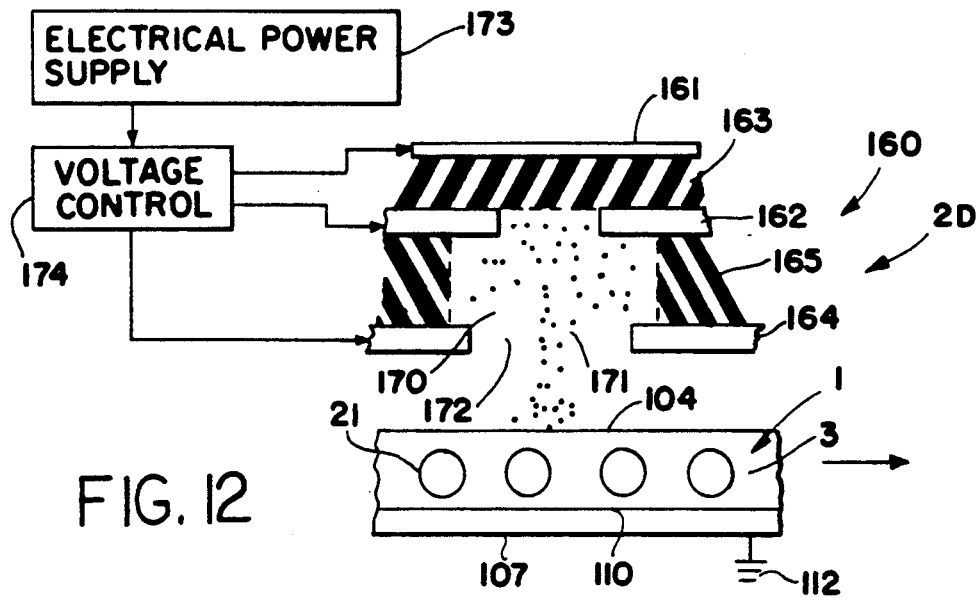
FIG. 12 is a fragmentary schematic elevation view of an ion generating system for applying electric charge to an optical read/write system.

In FIG. 12 is disclosed another controlled electron or ion deposition system 160 for depositing charge on the surface 104 of the medium 1. The system 160 is illustrated in conjunction with an overall optical read/write information storage system 2D (only part of which is illustrated in FIG. 12, the balance being, for example, of the type disclosed more completely in the other drawings hereof).

The system 160 is of the type used by Delphax Systems, Mississauga, Ontario, Canada and disclosed in their literature, for example, in literature concerning the Delphax Model 2460 imaging device. Portions of the Delphax System imaging devices also are disclosed in published European Patent Application No. 84300633.9, filed Feb. 1, 1984, Publication No. 0118989, published Sep. 19, 1984; U.S. Pat. No. 4,446,371, issued May 1, 1984; U.S. Pat. No. 4,448,872, issued May 15, 1984; and U.S. Pat. No. 4,476,387, issued Oct. 9, 1984. The entire disclosures of such publications are hereby incorporated by reference. Such disclosures are relevant to the schematic illustration of the controlled electron or ion deposition system 160 of FIG. 12 hereof.

The system 160 of FIG. 12 includes a drive line electrode 161, a finger electrode 162, an insulator 163 separating the two electrodes 161, 162, a screen electrode 164, and an insulator 165 separating the finger electrode 162 and screen electrode 164. The purpose of the system 160 is to deposit charge on the surface 104 of the medium 1, which serves as a dielectric layer. The conductive electrode 107 on the surface 110 of the medium 1 preferably is maintained at a reference potential, such as ground.

A cavity 170 is formed in the system 160 by the parts illustrated in FIG. 12. The conditions in such cavity are electrically controlled by the electrodes 161, 162, 164. Ions 171 are created in such cavity under control of such electrodes. In a sense a jet of ions can be created in the cavity to be directed to the surface 104; and such ion jet can be turned on and off by control of electrodes 161, 162, 164. As is described in the Delphax Systems literature, a pool of free ions can be generated when a high frequency voltage is applied across the finger electrode 162 and the drive line electrode 161. Exemplary excitation voltage may be 1 MHz at 2.5 KV peak-to-peak, as is proposed in the Delphax Systems literature.

If a positive potential is applied to the finger electrode 162 relative to the screen electrode 164, negative ions will be held in the cavity 170 and positive ions will be attracted to the screen electrode and neutralized. When the potential of the finger electrode 162 is made more negative than the screen electrode 164, negative ions will be repelled and will be caused to follow the electric field through the orifice 172 in the screen electrode 164 and cavity 170 to the surface 104 of the medium 1. An electrical power supply 173 provides electrical power for the energization of the electrodes 161, 162, 164 and the voltage (and/or frequency, period, etc.) applied to such electrodes may be controlled by the voltage control 174. Examples of circuitry that may be used for such purposes are presented in the Delphax Systems Delphax Model 2460 literature, for example.

The operation of the wire discharge electrode system 140 of FIG. 11 also may be similar to that disclosed for the system 160 of FIG. 12. In both cases the objective is to generate ions or electrons that can be deposited in a controlled fashion onto the surface 104 of the medium 1 to develop electric field for aligning liquid crystal structure.

It will be appreciated that although the systems 140, 160 are shown with a single opening from which electrons are directed to the medium, each system may be expanded to have a plurality of such openings and other related parts, including driving, energizing and synchronizing circuitry, for the purpose of simultaneously or in some known order depositing electrons at plural locations, tracks, etc. on the medium 1. An example of such multiple point deposition arrangement is disclosed in the Delphax Systems Delphax Model 2460 literature.

Figure 13:
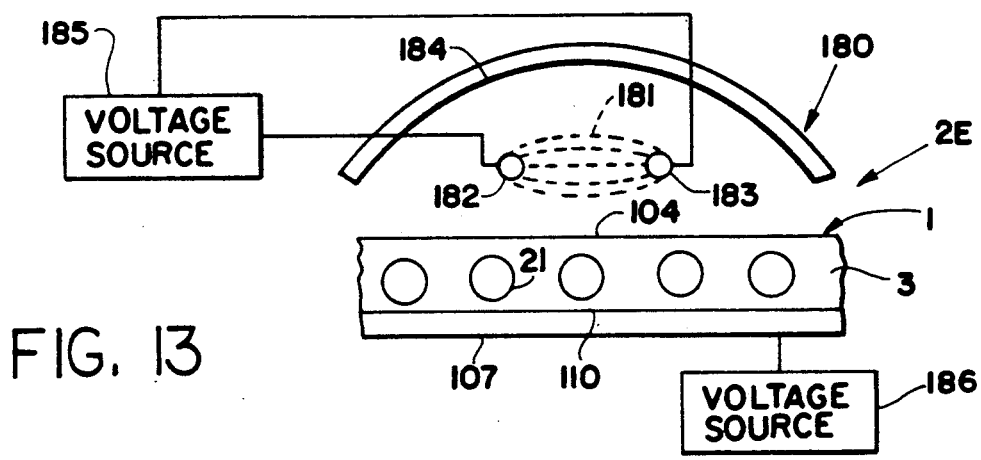
FIG. 13 is a fragmentary schematic elevation view of a corona generating system for generating electric charge for use in an optical read/write system.

In FIG. 13 is depicted schematically a bulk charge deposition system 180 for use in conjunction with an overall optical read/write information storage system 2E (only part of which is illustrated in FIG. 13, the balance being, for example, of the type disclosed more completely in the other drawings hereof). The system 180 is intended to apply charge to relatively large areas of the medium. The construction and operation of the system 180 may be, for example, of the type used to generate charge used in selenium drum discharge systems for copiers.

In the system 180 a corona 181 is established between a pair of electrodes 182, 183, such as wire electrodes; and that corona tends to be collected and directed or focused toward the surface 104 of the medium 1 using a reflector or shield 184. A variable voltage source 185 may be used to vary the voltage across the wires 182, 183 to alter the corona discharge and, thus, the supply of electrons therein and the force with which they may be directed toward the surface 104. Another variable voltage source 186 (or the same source 185) coupled to the electrode 107 can adjust the voltage of the electrode; and by effecting such adjusting, the amount of charge that is to be deposited on the surface 104 can be adjusted or controlled. The reflector/shield 184 may be an electrically conductive material which is provided to shield the corona 181. The reflector/shield 184 may be coupled to a fixed or variable potential or voltage supply to affect charge deposition on surface 104. It will be appreciated that by changing potentials in the system 180 the tendency for electrons to be forced toward the surface 104 may be controlled.

Additional Optical Write Technique

Figure 14:
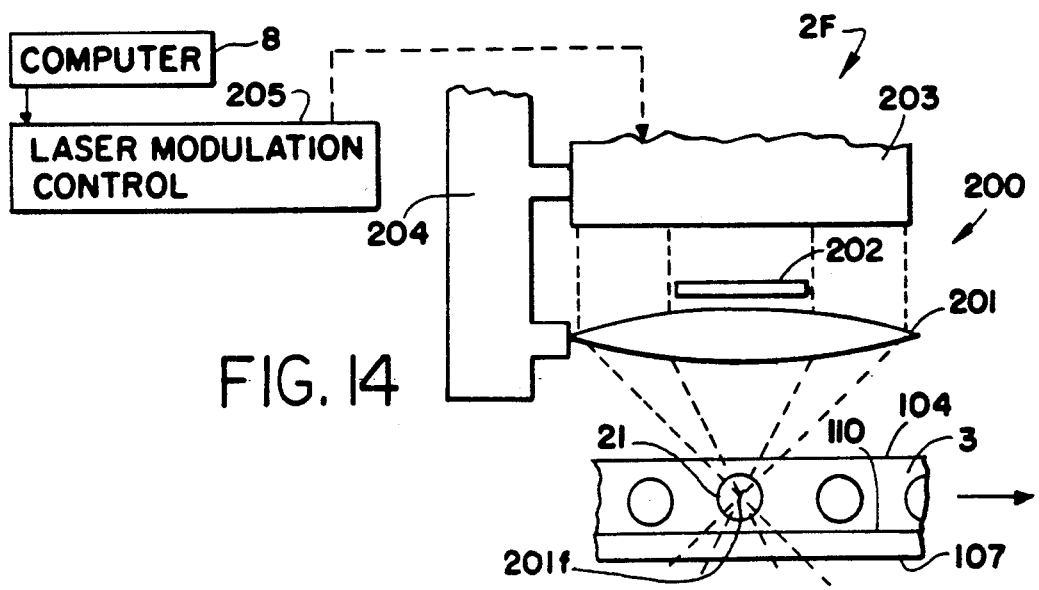
FIG. 14 is a fragmentary schematic elevation view of a optical system with a mask for developing and applying optical input to an optical read/write system.

An optical system for writing information in the medium 1 or to the disc 3 is illustrated at 200 in FIG. 14 and may be used as write optics 6 of FIG. 1. The optical system 200 includes a focusing member 201 and an optical stop 202, which are cooperative with each other and are positioned relative to the disc 3 to provide electromagnetic energy (hereinafter referred to as light, laser light or laser output, which should include an infrared or near infrared component for heating purposes) to the disc for effecting heating of the liquid crystal in one or more volumes thereof to effect the writing function. In the preferred embodiment the focusing member 201 is a lens, although it is possible that another focusing member, such as a reflector, may be used; and the stop 202 preferably is circular and is positioned substantially centered relative to the optical axis of the lens, although other configurations are possible.

The optical system 200 also may include a source 203 of such light energy, such as a laser, or the system 200 may be a separate system that receives input electromagnetic energy, regardless of the source thereof. Preferably such energy is in the form of collimated light to enable the lens 201 to focus such light at the focal point thereof; preferably such focal point is located in a volume or in the plane of the volumes 21 of liquid crystal in the medium 1.

Figure 15:
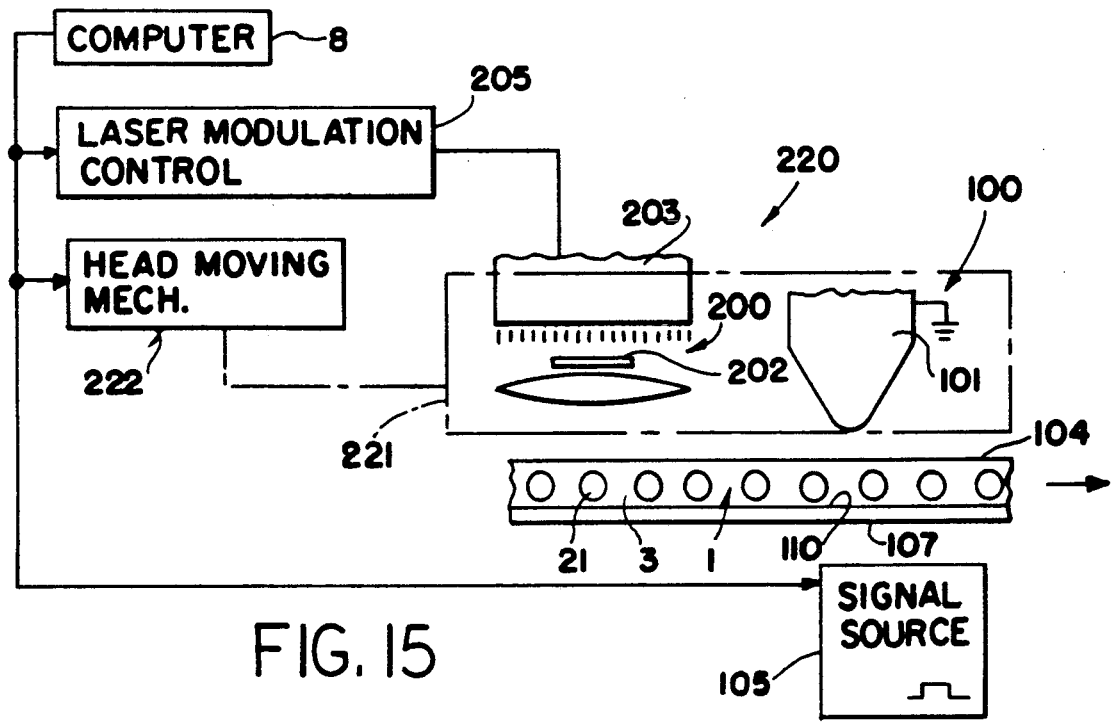
FIG. 15 is a fragmentary schematic elevation view of a composite erase and write assembly for an optical read/write system.

Additionally, the optical system 200 may include support structure 204 of generally conventional design for the purpose of supporting the several other elements thereof in positions related to each other, for example, in the manner illustrated in FIGS. 14 or 15, and related to the disc 3. The support structure 204 may be part of the write optics 6 (FIG. 1). The support structure also may hold the stop 202 in position, or as another possibility such stop may be secured, e.g., by adhesive, directly to the lens or otherwise held in position relative to the lens.

The optical system 200 is part of an optical read/write memory system 2F consistent with the several embodiments disclosed herein (only a part of such memory system being illustrated here), for example, as is illustrated and described in greater detail with respect to FIG. 1. The system 2F also includes a laser modulation control circuit 205 of conventional design, the purpose of which is to control turn on and turn off of the laser 203 to produce a laser output and/or to control the intensity of such laser output. Operation or control of the laser modulation control circuit 205 may be effected by the computer 8, thereby to determine when, and, thus, where on the disc 3 information is to be written.

It is desirable to concentrate heating energy of the laser output at the focal point 201f of the lens 201 and to maximize the extent to which such energy is dissipated (or is reduced in the concentration thereof) away from such focal point. Therefore, maximum energy would be concentrated where needed to heat liquid crystal, e.g., in one (several) volume(s) 21 thereof, and to cause such liquid crystal to assume a prescribed structural orientation; and the affect of the energy on liquid crystal not intended to be heated, e.g., in an adjacent volume(s) 21 thereof, would be minimized.

To achieve such energy concentration and such energy dissipation features, it is desirable that the lens 201 have a large numerical aperture number and that the stop 202 be used in conjunction with the lens. The higher such number, the quicker energy will be dissipated beyond such focal point. The stop 202 at the center of the lens 201 helps assure that input energy will not be directed to the liquid crystal in a volume 21, for example, already concentrated over a relatively small solid angle starting from the center area of the lens to the volume 21. The incident light from the edges of the lens comes into the volume 21 at a relatively wide angle and in annular fashion to avoid maximum (or extremely high level of) concentration in the liquid crystal volume. If such heat energy can be concentrated on only one volume of liquid crystal 21, for example, to achieve the desired structural alignment of the liquid crystal in such volume, then writing resolution becomes a function of the diameter of such volumes. This, of course, improves writing resolution of the system 200.

In operation of the optical write system 200, the computer 8 directs the laser modulation control 205 to energize the laser 203 to emit collimated light when the optical system is positioned at a location relative to the disc 3 where information is to be written, i.e. to cause the liquid crystal there to assume a distorted alignment to scatter incident reading light. To achieve such relative positioning to the disc 3, the support structure 204, including the write optics mechanism 6 (FIG. 1) may move the system 200 in a radial direction relative to the disc 3 as the disc 3 itself continues to be rotated by a motor 115 (FIG. 9).

The laser output causes heating of the liquid crystal in such volume(s) to release a previous parallel aligned configuration of the liquid crystal structure therein in one of two ways.

One of those ways is to raise the temperature of the liquid crystal material, which preferably is smectic or operationally smectic liquid crystal (for the memory, alignment and optical properties thereof, as are described herein, for example), at least in the operative temperature range of the disc 3 as a memory, to a temperature that exceeds the isotropic temperature of such liquid crystal. When such isotropic point or isotropic temperature is exceeded, the structural organization and characteristics of the liquid crystal are released or terminate. However, after the laser output is shut off or after the disc 3 rotates out of alignment with the write optics 200, such previously heated liquid crystal cools and regains the structural characteristics of a liquid crystal. As such characteristics are regained, the surface of the containment medium defining or bounding the volumes interacts with the liquid crystal to tend to distort the natural structure of the liquid crystal to a curvilinear aligned form depicted, for example, in volume 21 in FIG. 5. Relying on such surface interaction and/or on the organizational characteristics of the liquid crystal material itself, such curvilinear or distorted aligned condition will be maintained until a further input forces a parallel aligned condition (or some other aligned condition) of the liquid crystal to occur in the volume. Such further input may be in the form of an electric field or a magnetic field, for example, as is described elsewhere herein.

The other way in which such laser output heats the liquid crystal in such volume(s) to release a previous parallel aligned configuration of the liquid crystal structure therein relates to the characteristics of the smectic to nematic phase transition. More particularly, it is known that smectic liquid crystal has a certain memory characteristic to retain its structural alignment characteristics in a volume independently of surface interaction with the surface or wall of the volume in which such smectic liquid crystal is contained. On the other hand, nematic liquid crystal material is much more susceptible to surface interaction to cause alignment of liquid crystal structure, e.g., to curvilinear alignment, as is disclosed in a number of applicant's above-mentioned issued U.S. patents and pending applications. The smetic to nematic phase transition temperature ordinarily is lower than the isotropic temperature for the liquid crystal. By raising the temperature of the smectic liquid crystal to the smectic to nematic transition temperature, the liquid crystal takes on the characteristics of nematic liquid crystal without having to be raised even higher in temperature to the isotropic point, thus reducing the input energy requirements of the system for writing. With the liquid crystal in the nematic phase, in the absence of an electric field or a magnetic field input to it, the liquid crystal will be susceptible to interaction with the surface of the wall of the containment medium bounding the volume thereof so as to be forced or distorted to the curvilinear or random aligned condition shown, for example, in volume 22 of FIG. 3.

Composite Optical And Electrical System

As is illustrated in FIG. 15, a composite arrangement 220 and common support 221 for write and erase systems may be provided for the invention. In the illustrated embodiment, such composite arrangement 220 includes a pointed tip electrode system 100 described in detail above with respect to FIG. 9 and an optical write system 200 described above with respect to FIG. 14. A common support 221 provides support for both the systems 100, 200. Such support may be, for example, a conventional disk drive head support and/or moving/tracking system. Such support may move under control and motive force of a conventional head moving mechanism 222, e.g., as is typically used in conventional floppy and/or hard or fixed disc drive systems that use magnetic storage media to store information therein. The computer 8 may be used to provide input control of the head moving mechanism to effect desired radial or other movement of the support 221 relative to the disc 3. The computer 8 also controls the laser modulation control 205 and the signal source 105, respectively to energize the optical write system 200 and/or the electrode system 100, as was described above. Thus, it will be appreciated that the composite arrangement 220 permits simultaneous writing and erasing of respective portions of a disc 3.

Depending on the direction of movement of the disc 3, the speed at which the liquid crystal responds to an optical or electrical input, and the speed with which energy (e.g., heat and/or electrical charge) is dissipated from the disc 3, the particular orientation of the write and erase parts of the composite system 220 can be adjusted. For example, if the charge dissipates adequately fast, then heating to write can occur almost immediately after the charge had been applied; and if heat dissipates so fast, then charge erasing can occur relatively promptly after heating to write had occurred; in either case, the write and erase systems may be positioned generally serially relative to the disc 3 movement so that such systems are aligned on a common track.

Alternatively, such serial alignment may be provided even though the speed with which energy dissipates is not fast enough for such quich serial operation; and in such case, the computer 8 would assure that an adequate delay is provided between the time that a write or read operation had occurred and the next opposite operation is required. As still a further alternative, it will be appreciated that the erase and write systems of the composite system may be positioned on the support 221 in radial relation to each other, so that one is closer to the radial center of the disc 3 than is the other; in this way both the write and erase systems could operate simultaneously to effect their functions without interfering with each other, regardless of energy dissipation rate.

Enhanced Thermal Energy Absorption

Figures 16, 17:
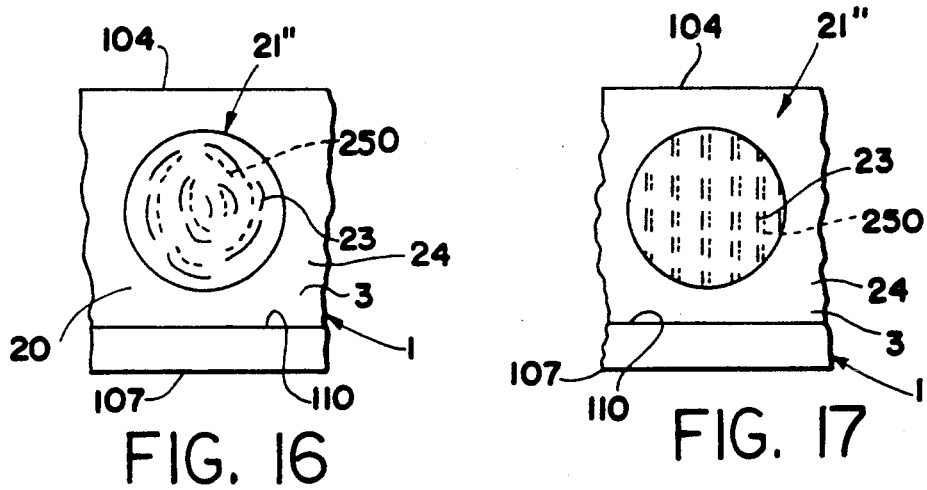
FIGS. 16 and 17 are schematic illustrations of volumes of liquid crystal containing pleochroic dye, respectively in distorted or random alignment and in parallel alignment.

To enhance the heat absorption in respective volumes 21 of liquid crystal, a pleochroic dye 250 which absorbs infrared or near infrared energy may be added to the liquid crystal. In FIGS. 16 and 17 such pleochroic dye embodiment is illustrated schematically in a fragmentary drawing of the medium 1 of which the disc 3 is formed. A volume 21" (the double primed reference numeral indicates that the volume of liquid crystal 23 is substantially the same in form and function as the other volumes of liquid crystal referred to herein by the reference numeral 21) of liquid crystal 23 in a containment medium 24 also has pleochroic dye 250 therein.

As is described in applicant's above mentioned patents and application(s), such dye will tend to align with the liquid crystal structure. Therefore, when the liquid crystal structure is in curvilinear aligned form, as is illustrated in FIG. 16, the dye also will be curvilinearly aligned and will absorb light, e.g., in the preferred embodiment in the infrared and/or near infrared range. When the liquid crystal structure is in parallel alignment, as is illustrated in FIG. 17, the dye will be in parallel alignment, and since such alignment is parallel or substantially parallel to the direction of intended propagation direction of light energy for writing to the liquid crystal and/or for reading the parallel or curvilinear aligned state of the liquid crystal in the volume thereof, there will be minimal absorption.

In the preferred embodiment of the invention, the liquid crystal material is an oil base material. Therefore, to help assure that the pleochroic dye will mix in and will align with respect to the liquid crystal structure, such dye should be an oil soluble dye. The dye also preferably should be an infrared absorbing dye so as to concentrate heating in the liquid crystal material and not in the containment medium. Dyes other than pleochroic may be used. The dye should be in the liquid crystal 23 and not in the containment medium 24 so that the concentration of heating is in the liquid crystal and not in the medium. The particular advantage to using pleochroic dye is that it selectively aligns according to liquid crystal alignment. Moreover, the dye should have minimal attenuation of light used for purposes of reading the disc 3.

Initially the dye does not absorb very much energy when it is aligned in parallel, as is illustrated in FIG. 17. However, as the liquid crystal and dye begin to assume a curvilinear alignment as the smectic to nematic phase transition temperature is approached, the dye absorbs more energy and further expedites completion of the smectic to nematic phase transition. This, therefore, expedites the distorting of the liquid crystal structure to curvilinear aligned condition of FIG. 16.

It will be appreciated, then, that the dye 250 enhances absorption of heat energy in the liquid crystal volume 21 on which incident write energy, e.g., laser energy, is directed. Thus, in this and in the other embodiments wherein laser energy is used to write to the disc 3, it is necessary that the energy include heat energy, energy that can be converted into heat, infrared energy, etc.

To minimize attenuation of light used for purposes of reading the disc 3 and/or to minimize the possibility that the dye would cause the heating in a volume 21 of liquid crystal 23 at too fast a rate, only a relatively small amount of dye ordinarily would be used.

An exemplary dye useful according to the invention is Blue M-141 red absorbing dye by Mitisui Toatsu. Such dye was found to absorb heat energy in the liquid crystal material to concentrate heat in the liquid crystal and to give rise to increased resolution and/or speed of operation of the system 2 according to the invention, as is fully described herein.

Enhanced resolution or degree to which a bit of information is isolated from others in the storage medium 3 is achieved due to the fact that the transition from smectic phase to nematic phase can occur in response to an input of energy to the liquid without the need for a temperature increase, as a result of enthalpy characteristics of the liquid crystal. For phase transition from the smectic phase to nematic phase, thermal energy is required to increase the enthalpy of the liquid crystal in the volume(s) thereof, but there is no increase or only a small increase in temperature at the transition point, as is well known. This feature is depicted in the curve 280 of the graph of FIG. 18.

Figure 18:
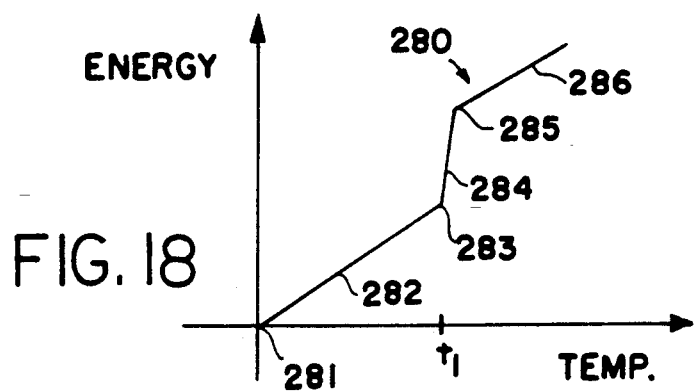
FIG. 18 is a graph depicting operation of the volumes of liquid crystal and dye of FIGS. 16 and 17 in an optical read/write storage system of the present invention.

In the graph of FIG. 18 the curve 280 is plotted as energy input E to the liquid crystal 23 in a volume 21 thereof against the temperature T of that liquid crystal. From an initial temperature represented at 281 at the intersection of the two axes of the graph of FIG. 18 (such temperature is below the transition temperature $t_1$ but is not necessarily zero or any other particular temperature—preferably such initial temperature is just a few degrees below the transition temperature) the curve 280 has a slope of about 1 as heating commences. As heat energy continues to be applied to the liquid crystal, heating continues and temperature increases as is represented by part 282 of the curve 280. However, at the smectic to nematic phase transition point or temperature $t_1$ represented at point 283 on the curve 280, temperature remains essentially stable or constant while energy continues to be applied, as is represented by part 284 of the curve 280. Such continued energy input is due to the enthalpy for achieving transition from smectic phase to nematic phase. When adequate energy of transition is applied, as is represented by part 284 of the curve, e.g., the distance between points 283 and 285 thereof, the transition from smectic phase to nematic phase is achieved, this at point 285 on the curve. The temperature of the point 285 is the same or substantially the same as the temperature $t_1$. After transition has occurred, the curve 280 follows part 286 thereof, as temperature again begins to increase as a function of energy input to the liquid crystal 23.

By taking advantage of the shape of the curve 280 and the enthalpy characteristics related to transition from smectic phase to nematic phase, it is possible to maintain the liquid crystal 23 which has undergone phase transition at substantially the same temperature as the liquid crystal in adjacent volumes thereof which had not undergone such transition. Since temperatures are the same or at least substantially the same, there is no or only a small temperature gradient between such volumes, and thermal energy conduction will not occur or at least will be substantially minimized. Therefore, it will be appreciated that it is desirable to stop further energy input to the liquid crystal 23 just after the point 285 has been reached thereby to reduce the amount of further temperature rise of the liquid crystal along curve part 286 and to minimize any temperature gradient between that liquid crystal volume(s) that has undergone such phase transition and those liquid crystal volumes that have not undergone phase transition. Moreover, by providing control of energy input to the liquid crystal 23 to maintain temperature at or near phase transition temperature $t_1$, preventing tendency to conduct heat into and through the containment medium 24 to another volume of liquid crystal or in any event unnecessarily and inefficiently to raise the average temperature of the medium 24, overall efficiency and resolution of the optical read/write system 2 of the present invention is improved.

It will be appreciated that the several embodiments of optical storage and retrieval system 2 of the invention may be associated with the computer 8 to store information. Such information preferably is in digital format and may be represented, for example, by the scattering or not of light by respective volumes of liquid crystal materials. As to which of the scattered light or transmitted (and generally undetected in the disclosed preferred embodiment) light represents a logic 1 or a logic 0 can be according to convention selected by a user of the invention. As to whether the photodetector detects scattered light (according to the preferred embodiment of the invention) or transmitted light (e.g. by altering the schlieren optics detecting system and/or by using a photodetector on the opposite side of the medium 1 from the incident read laser light source 31') also can be altered according to the invention, as will be appreciated by those skilled in the art.

Moreover, it will be appreciated that the optical storage and retrieval system of the invention may be used to store information representing audio or video signals for use, e.g. in accordance with compact disc audio systems, laser disc video systems and even with other video pick-up, storage and play back systems.

Various equivalents may be used consistently with the invention, and other modifications also may be made in accordance with the present invention, which is intended to be limited only according to the scope of the following claims.

I claim:

1. An optical read/write information storage system, comprising
   liquid crystal information storage means for storing information written thereto and being capable of being read, including plural volumes of liquid crystal material in a containment medium.
   said storage means being capable of receiving a first energy input to assume and to store a first detectable output condition and being capable of receiving a second energy input to assume and to store a second detectable output condition.
   write means for furnishing such energy inputs to said storage means,
   read means for detecting such output conditions of said storage means,
   erase means for erasing information written to said storage means, and
   said erase means comprising a pointed electrode for the application of electric field to the storage means.

2. The system of claim 1,
   wherein said storage means comprises liquid crystal material contained in plural volumes in a containment medium, said storage means having a surface and being operative at least temporarily to store on said surface electric charge operative to effect structural alignment of the liquid crystal material.

3. The system of claim 2, said erase means comprising an electron generating means for generating such charge, and controlling means for controlling deposition of such charge on said liquid crystal information storage means.

4. In a liquid crystal memory system, including a liquid crystal apparatus for storing information, the improvement comprising a pointed electrode with a tip, the tip of said pointed electrode delivering charge to the liquid crystal apparatus in order to effect storage of information therein.

5. The improvement of claim 4,
   further comprising an electrically conductive shield surrounding at least part of said pointed electrode, and
   further comprising electrical energy means for applying electrical energy to said pointed electrode, said liquid crystal apparatus including a further electrode on one surface thereof, and further comprising means for maintaining said further electrode at a relatively fixed reference potential as electrical energy to said electrode is varied by said electrical energy means.

6. In a liquid crystal memory system, including a liquid crystal apparatus for storing information, the improvement comprising a charge generating and delivering system for effecting information storage therein, including electrode means for generating electrical charge, and control means for controlling delivery of electrical charge from a supply of electrons to said liquid crystal apparatus, and wherein said liquid crystal apparatus comprises a plurality of volumes of smectic liquid crystal material in a containment medium, the ordinary index of refraction of the smectic liquid crystal material being substantially matched to that of the containment medium, and the extraordinary index of refraction of the smectic liquid crystal material being different from that of the containment medium, wherein said electrode means includes a pair of electrodes positioned in spaced relation and energizable electrically for generating ions, cavity means for retaining at least temporarily a plurality of said ions as a pool of ions, and said control means comprises a further electrode and means for altering the voltage of such further electrode relative to at least one of said pair of electrodes.

7. In a liquid crystal memory system, including a liquid crystal apparatus for storing information, the improvement comprising a charge generating and delivering system for effecting information storage therein, including electrode means for generating electrical charge, and control means for controlling delivery of electrical charge from a supply of electrons to said liquid crystal apparatus, and wherein said liquid crystal apparatus comprises a plurality of volumes of smectic liquid crystal material in a containment medium, the ordinary index of refraction of the smectic liquid crystal material being substantially matched to that of the containment medium, and the extraordinary index of refraction of the smectic liquid crystal material being different from that of the containment medium, said electrode means includes a wire and a source of electrical energy for enabling such wire to emit electrons therefrom, and said control means comprises a further electrode and means for altering the voltage of such further electrode relative to said wire, and wherein said further electrode comprises an electrically conductive plate-like member having opening means therein for passing therethrough such electrons from said wire to said liquid crystal apparatus.

* * * * *